United States Patent
Tseng et al.

(10) Patent No.: US 12,432,400 B2
(45) Date of Patent: Sep. 30, 2025

(54) LIVESTREAM WITH SYNTHETIC SCENE INSERTION

(71) Applicant: Loop Now Technologies, Inc., San Mateo, CA (US)

(72) Inventors: Hong-Ming Tseng, Toronto (CA); Edwin Chiu, Cupertino, CA (US); Wu-Hsi Li, Somerville, MA (US); Jerry Ting Kwan Luk, Menlo Park, CA (US); Jeremiah Kevin Tu, Sunnyvale, CA (US)

(73) Assignee: Loop Now Technologies, Inc., San Mateo, CA (US)

( * ) Notice: Subject to any disclaimer, the term of this patent is extended or adjusted under 35 U.S.C. 154(b) by 0 days.

(21) Appl. No.: 18/430,720

(22) Filed: Feb. 2, 2024

(65) Prior Publication Data
US 2024/0267573 A1   Aug. 8, 2024

Related U.S. Application Data

(60) Provisional application No. 63/613,312, filed on Dec. 21, 2023, provisional application No. 63/604,261, (Continued)

(51) Int. Cl.
*H04N 21/234* (2011.01)
*G06T 7/194* (2017.01)
*G10L 15/18* (2013.01)
*H04N 21/2187* (2011.01)
*G10L 15/08* (2006.01)

(52) U.S. Cl.
CPC ....... *H04N 21/23424* (2013.01); *G06T 7/194* (2017.01); *G10L 15/1822* (2013.01); *H04N 21/2187* (2013.01); *G10L 2015/088* (2013.01)

(58) Field of Classification Search
CPC .............................. H04N 21/23424
See application file for complete search history.

(56) References Cited

U.S. PATENT DOCUMENTS 8,069,414 B2   11/2011   Hartwig et al.
8,244,707 B2   8/2012   Lin et al.
(Continued)

FOREIGN PATENT DOCUMENTS

KR   101606860 B1   3/2016

*Primary Examiner* — Michael H Hong
(74) *Attorney, Agent, or Firm* — Adams Intellex, PLC

(57) ABSTRACT

Disclosed embodiments provide techniques for livestream with synthetic scene insertion. A prerecorded livestream featuring a host is rendered to one or more viewers. An operator accesses a video segment related to the prerecorded livestream. The related video segment includes a performance by an individual. The operator retrieves an image of the host of the prerecorded livestream and creates from the related video segment a synthesized video segment that includes the performance of the individual accomplished by the host. One or more insertion points are determined within the prerecorded livestream for the insertion of the synthesized video segment. The operator inserts the synthesized video segment into the prerecorded livestream at the one or more determined insertion points. The insertion is accomplished dynamically and appears seamless to the viewer. The remainder of the prerecorded video is rendered to the one or more viewers after the insertion point.

26 Claims, 9 Drawing Sheets

Related U.S. Application Data filed on Nov. 30, 2023, provisional application No. 63/546,768, filed on Nov. 1, 2023, provisional application No. 63/546,077, filed on Oct. 27, 2023, provisional application No. 63/536,245, filed on Sep. 1, 2023, provisional application No. 63/524,900, filed on Jul. 4, 2023, provisional application No. 63/522,205, filed on Jun. 21, 2023, provisional application No. 63/472,552, filed on Jun. 12, 2023, provisional application No. 63/464,207, filed on May 5, 2023, provisional application No. 63/458,733, filed on Apr. 12, 2023, provisional application No. 63/458,458, filed on Apr. 11, 2023, provisional application No. 63/458,178, filed on Apr. 10, 2023, provisional application No. 63/454,976, filed on Mar. 28, 2023, provisional application No. 63/447,925, filed on Feb. 24, 2023, provisional application No. 63/447,918, filed on Feb. 24, 2023, provisional application No. 63/443,063, filed on Feb. 3, 2023.

(56) References Cited

U.S. PATENT DOCUMENTS

| | | | |
|---|---|---|---|
| 8,572,490 | B2 | 10/2013 | Hartwig et al. |
| 9,118,712 | B2 | 8/2015 | McCoy et al. |
| 9,152,392 | B2 | 10/2015 | Petro et al. |
| 9,532,116 | B2 | 12/2016 | Terpe |
| 9,608,983 | B2 | 3/2017 | Fee |
| 9,645,700 | B2 | 5/2017 | Tsai |
| 9,693,013 | B2 | 6/2017 | Nesamoney et al. |
| 9,824,372 | B1 | 11/2017 | Seth et al. |
| 10,089,402 | B1 | 10/2018 | Winkler et al. |
| 10,496,350 | B2 | 12/2019 | Lazier et al. |
| 10,955,999 | B2 | 3/2021 | Lotinsky et al. |
| 11,317,060 | B1 | 4/2022 | Libin |
| 2007/0043713 | A1 | 2/2007 | Elmi et al. |
| 2010/0149359 | A1 | 6/2010 | Taoka |
| 2013/0021373 | A1 | 1/2013 | Vaught et al. |
| 2013/0097477 | A1 | 4/2013 | Adolf et al. |
| 2013/0145267 | A1 | 6/2013 | Ramachandran |
| 2013/0215116 | A1 | 8/2013 | Siddique et al. |
| 2013/0276021 | A1 | 10/2013 | Cho |
| 2014/0101537 | A1 | 4/2014 | Antkowiak et al. |
| 2014/0106881 | A1 | 4/2014 | Antkowiak et al. |
| 2014/0229331 | A1 | 8/2014 | McIntosh et al. |
| 2014/0376876 | A1 | 12/2014 | Bentley et al. |
| 2015/0177940 | A1 | 6/2015 | Trevino et al. |
| 2015/0195175 | A1 | 7/2015 | Kariman |
| 2015/0213516 | A1 | 7/2015 | Jeremias |
| 2015/0278348 | A1 | 10/2015 | Paruchuri et al. |
| 2016/0065929 | A1 | 3/2016 | Barcons-Palau et al. |
| 2016/0088369 | A1 | 3/2016 | Terpe |
| 2016/0093105 | A1 | 3/2016 | Rimon et al. |
| 2017/0109584 | A1 | 4/2017 | Yao et al. |
| 2017/0269816 | A1 | 9/2017 | Bradley et al. |
| 2018/0068019 | A1 | 3/2018 | Novikoff et al. |
| 2018/0132011 | A1 | 5/2018 | Shichman et al. |
| 2018/0253765 | A1 | 9/2018 | Avedissian et al. |
| 2018/0288396 | A1 | 10/2018 | Bouazizi et al. |
| 2021/0014559 | A1 | 1/2021 | Thapaliya |
| 2022/0053233 | A1 | 2/2022 | Baxter et al. |
| 2022/0122161 | A1 | 4/2022 | Perera |
| 2022/0191594 | A1 | 6/2022 | Devoy, III et al. |
| 2022/0345755 | A1 | 10/2022 | Pollock et al. |
| 2022/0353473 | A1 | 11/2022 | Springer |
| 2023/0033378 | A1* | 2/2023 | Zhu ............... H04N 21/23418 |
| 2023/0081982 | A1* | 3/2023 | He ....................... G06V 10/751 382/157 |
| 2023/0126108 | A1 | 4/2023 | Roper |

* cited by examiner

LIVESTREAM WITH SYNTHETIC SCENE INSERTION

RELATED APPLICATIONS

This application claims the benefit of U.S. provisional patent applications "Livestream With Synthetic Scene Insertion" Ser. No. 63/443,063, filed Feb. 3, 2023, "Dynamic Synthetic Video Chat Agent Replacement" Ser. No. 63/447,918, filed Feb. 24, 2023, "Synthesized Realistic Metahuman Short-Form Video" Ser. No. 63/447,925, filed Feb. 24, 2023, "Synthesized Responses To Predictive Livestream Questions" Ser. No. 63/454,976, filed Mar. 28, 2023, "Scaling Ecommerce With Short-Form Video" Ser. No. 63/458,178, filed Apr. 10, 2023, "Iterative AI Prompt Optimization For Video Generation" Ser. No. 63/458,458, filed Apr. 11, 2023, "Dynamic Short-Form Video Transversal With Machine Learning In An Ecommerce Environment" Ser. No. 63/458,733, filed Apr. 12, 2023, "Immediate Livestreams In A Short-Form Video Ecommerce Environment" Ser. No. 63/464,207, filed May 5, 2023, "Video Chat Initiation Based On Machine Learning" Ser. No. 63/472,552, filed Jun. 12, 2023, "Expandable Video Loop With Replacement Audio" Ser. No. 63/522,205, filed Jun. 21, 2023, "Text-Driven Video Editing With Machine Learning" Ser. No. 63/524,900, filed Jul. 4, 2023, "Livestream With Large Language Model Assist" Ser. No. 63/536,245, filed Sep. 1, 2023, "Non-Invasive Collaborative Browsing" Ser. No. 63/546,077, filed Oct. 27, 2023, "AI-Driven Suggestions For Interactions With A User" Ser. No. 63/546,768, filed Nov. 1, 2023, "Customized Video Playlist With Machine Learning" Ser. No. 63/604,261, filed Nov. 30, 2023, and "Artificial Intelligence Virtual Assistant Using Large Language Model Processing" Ser. No. 63/613,312, filed Dec. 21, 2023.

Each of the foregoing applications is hereby incorporated by reference in its entirety.

FIELD OF ART

This application relates generally to video analysis and more particularly to livestream with synthetic scene insertion.

BACKGROUND

The reporting of important news events began with word-of-mouth stories passed from one person or group to another. In some cases, drawings and paintings were added to the record of events, but for many years, one person relating a story to another was the main way in which news was passed on. As written alphabets developed and grew, announcements of historic events and important information were written down and distributed by heralds or other messengers. Even in these cases, the messenger would often read aloud the text of the message. As time progressed, announcements would be posted in public squares and common gathering places in order to communicate news. As the printing press came into use, newsletters began to be circulated throughout Europe. Antwerp became a hub of two networks of newsletter distribution, one reaching France, Britain, Germany, and the Netherlands, and the other linking Italy, Spain, and Portugal. The newsletters contained articles on wars, military affairs, diplomacy, court business, and gossip. Throughout Europe, as printing became less expensive and newsprint paper became more available, the 19th century saw an explosion of newspapers. The number of newspapers in Europe was nearly 12,000 by 1900 with major newspapers in every capital city in Europe. At the same time, print advertising became well established and the main source of revenue for newspaper owners. As distribution of newspapers grew, professional reporters came onto the scene. Newspapers began to influence public opinion, and entrepreneurs driven by profit began to use the press to shape political party positions and to support particular candidates for office. As distribution expanded, the price of a newspaper fell to a penny. Sensationalism, comics, sports, crime, and advertising became major drivers in newspaper sales. Women's columns appeared with advice on family, household, and fashion issues and advertising targeted at women increased dramatically.

As the printed newspaper industry grew and flourished, a technical innovation of enormous impact was developing as well. The discovery of electromagnetic waves, including radio waves, began in the early 1800s. By the end of the year 1906, wireless telephony was used to make the first public wireless broadcast. By 1931, a majority of U.S. households owned at least one radio receiver. At first, radio was primarily a source of entertainment, rather than information. This began to change when Edward R. Murrow traveled to England and broadcast news about World War II. He was the first to report on events such as the bombings in London and Hitler's annexation of Austria. Americans relied on Murrow's broadcasts to gain information about the war, just as the British public relied on BBC broadcasts. After the attack on Pearl Harbor, reliance on radio grew significantly, and its importance to advertisers grew along with it. Throughout the post-WWII years, radio was the dominant source of news and advertising, until the assassination of John F. Kennedy in 1963. At this point, television overtook radio as the main source of news delivery. Radio could only capture the sound of the event, but television could show its audience the impact of the assassination and its aftermath. News crews covered everything they could about the events in Dallas, Texas, and Washington, D.C., from the police investigations to the funeral of the president. The coverage of the events as they occurred, including the killing of Lee Harvey Oswald, worked to transfer public preferences for television for news and entertainment. Advertising followed suit, as marketing campaigns spent more and more of their budgets on television rather than radio.

The next technical innovation to significantly impact news and information distribution was the Internet. In the 1970, a team of scientists developed a communications system for the U.S. defense department to survive a nuclear attack. By 1991, the World Wide Web was opened to the public. Since then, the uses of the Internet for every form of entertainment, news, and other information production and distribution have grown exponentially. Real-time distribution of news events, sporting events, and entertainment performances as they occur, including commentary by witnesses at the scene, has become commonplace. Along with the proliferation of information sources, advertising linked to the publication sources, and data about the consumers of the events, has exploded. Demand for instant news, entertainment, commentary, consumer goods, and services continues to drive the growth of internet-based platforms and will continue to do so well into the future.

SUMMARY

Livestream events are a growing and increasingly important means of engaging viewers in education, government, and ecommerce. As livestream events become more sophisticated, viewers are becoming increasingly selective in their choices of event content, delivery, and hosts. Finding the best spokesperson for a livestream event can be a critical component to the success of marketing a product. Ecommerce consumers can discover and be influenced to purchase products or services based on recommendations from friends, peers, and trusted sources (like influencers) on various social networks. This discovery and influence can take place via posts from influencers and tastemakers, as well as from friends and other connections within the social media systems. In many cases, influencers are paid for their efforts by website owners or advertising groups. The development of effective short-form videos in the promotion of goods and services is often a collaboration of professionally designed scripts and visual presentations distributed along with influencer and tastemaker content in various forms. Livestream events can be used to combine prerecorded, designed content with viewers and hosts. These collaborative events can be used to promote products and gather comments and opinions from viewers at the same time. Operators behind the scenes can respond to viewers in real time, engaging the viewers and increasing the sales opportunities. By harnessing the power of machine learning and artificial intelligence (AI), media assets can be used to inform and promote products using the images and voices of influencers best suited to the viewing audience. Using the techniques of disclosed embodiments, it is possible to create effective and engaging content in real-time collaborative events.

Disclosed embodiments provide techniques for livestream with synthetic scene insertion. A prerecorded livestream featuring a host is rendered to one or more viewers. An operator accesses a video segment related to the prerecorded livestream. The related video segment includes a performance by an individual. The operator retrieves an image of the host of the prerecorded livestream and creates from the related video segment a synthesized video segment that includes the performance of the individual accomplished by the host. One or more insertion points within the prerecorded livestream for the insertion of the synthesized video segment are determined. The operator inserts the synthesized video segment into the prerecorded livestream at the one or more determined insertion points. The insertion is accomplished dynamically and appears seamless to the viewer. The remainder of the prerecorded video is rendered to the one or more viewers after the insertion point.

A computer-implemented method for video analysis is disclosed comprising: rendering a prerecorded livestream, wherein the prerecorded livestream features a host and is viewed by one or more viewers; accessing, by an operator, a video segment that is related to the prerecorded livestream, wherein the video segment includes a performance by an individual; retrieving an image of the host; creating, from the video segment that was accessed, a synthesized video segment, wherein the synthesized video segment includes the performance accomplished by the host; determining at least one insertion point, within the prerecorded livestream, for the synthesized video segment; inserting, by the operator, the synthesized video segment into the prerecorded livestream at the at least one insertion point, wherein the inserting is accomplished dynamically and wherein the inserting appears seamless to the viewer; and rendering a remainder of the prerecorded livestream after the at least one insertion point. In embodiments, the determining at least one insertion point further comprises forming a response to an interaction by the one or more viewers of the prerecorded livestream. In embodiments, the inserting the synthesized video segment comprises the response to the interaction by the one or more viewers. In embodiments, the determining at least one insertion point further comprises analyzing the prerecorded livestream. And in embodiments, the analyzing includes detecting one or more words spoken by the host.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
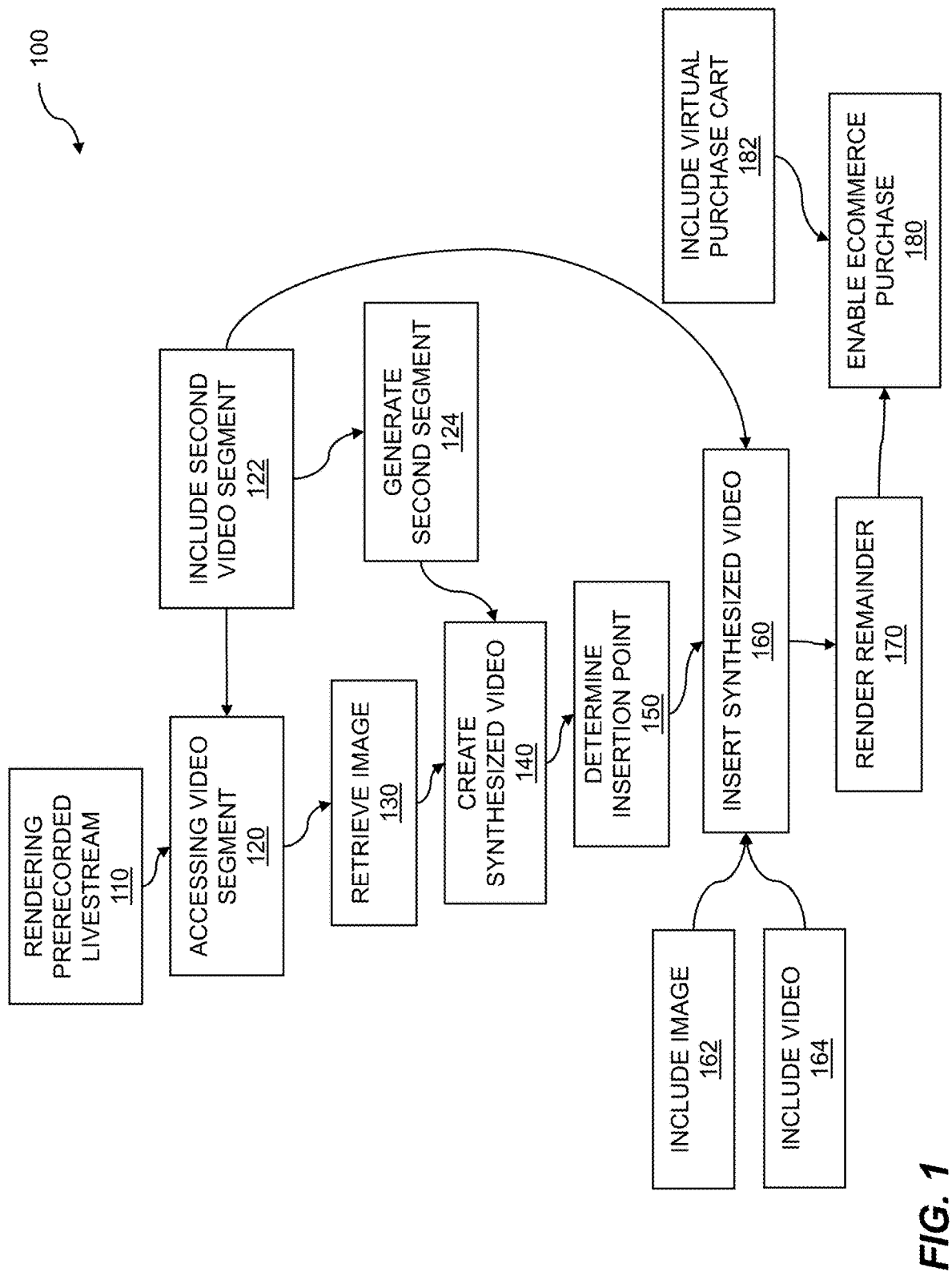
FIG. 1 is a flow diagram for a livestream with synthetic scene insertion.

Producing and refining effective media content can be an expensive process. Preparing locations; engaging staff; developing scripts; and recording and editing video, images, audio, and text can require many hours and much trial and error before a usable version is ready. Ecommerce outlets, social media sites, and the ability for vendors, marketers, influencers, and shoppers to comment directly on products and services in real time are demanding shorter and shorter creation times for effective media events. Delays in getting the word out on a product or service can result in lost sales opportunities, a reduction in market share, and lost revenue.

Disclosed embodiments address the time required to create a livestream event by leveraging a vast library of existing media assets and the expanding effectiveness of AI machine learning models. Media assets can include short-form videos, still images, audio clips, text, synthesized video, synthesized audio, and more. Media assets are selected in real time by livestream operators and are presented to viewers in a dynamic and seamless manner. Comments and questions posed by viewers can be answered during the livestream event, increasing engagement and the likelihood of sales. Production costs are reduced at the same time, as existing media assets are leveraged. Thus, disclosed embodiments improve the technical field of video generation.

Techniques for video analysis are disclosed. A prerecorded livestream event can be accessed and presented to a group of viewers. The replay of the livestream can be accessed by viewers in real time, allowing interaction between viewers and operators of the livestream. Short-form video segments related to products and subjects discussed during the livestream can be accessed by the operator of the prerecorded livestream. The video segments can be selected based on comments or questions raised by viewers during the livestream event, in addition to segments preselected based on subjects and products discussed in the livestream. The video segments can include images or videos of products or subjects discussed by the host of the livestream. The individual performing in the video segments can be a different presenter from the host of the prerecorded livestream. Images of the livestream host can be collected and combined using artificial intelligence (AI) machine learning to create a 3D model of the host, including facial features, expressions, gestures, clothing, accessories, etc. The 3D model of the host can be combined with the video segments to create synthesized video segments in which the livestream host is seen as the presenter. AI machine learning can be used to swap the voice of the video segment individual presenter with the voice of the livestream host. Thus, the host of the prerecorded livestream becomes the presenter of the synthesized video segments for the viewers.

The prerecorded livestream can be analyzed to determine insertion points for the synthesized video segments into the livestream event. The insertion points can be determined based on words spoken by the host, actions taken by the host, voice inflections of the host, subjects discussed by the host, and body positions of the host. The livestream operator can select the insertion point based on the comments and questions raised by viewers during the livestream event, so that the synthesized video segment becomes the response to the viewer comment or question. The insertion of the synthesized video segment can be accomplished dynamically to appear seamless to the viewer. The insertion of the synthesized video segment can be accomplished by stitching the segment into the livestream event at one of the determined insertion points. One or more boundary frames can be identified in the prerecorded livestream and the synthesized video segment and can be used to smooth the transition from the livestream to the video segment. The stitching component can insert or remove one or more frames from the beginning or end of the video segment or from the boundary frames of the livestream in order to make the transition from one to the other seamless. Morphing of one or more frames can be used to make the transition seamless. Objects that appear in the livestream background that are not in the synthesized video segment can be isolated and inserted into the video segment in the same relative location. Objects that appear in the video segment that are not in the livestream can be removed as well. At the end of the synthesized video segment, boundary frames can be used to smooth the transition back to the remainder of the prerecorded livestream. Multiple synthesized video segments can be generated and inserted into the prerecorded livestream in order to respond to viewer comments and questions as they occur during the livestream replay.

The prerecorded livestream and synthesized video segments can be rendered to the viewers in real time as an operator selects video segments in response to viewer questions and comments. As the livestream event occurs, products for sale can be highlighted and an ecommerce environment can be included. An on-screen product card and virtual purchase cart can be rendered as part of the ecommerce environment and can be used by viewers to purchase products for sale while the prerecorded livestream and synthesized video segments are playing.

FIG. 1 is a flow diagram 100 for a livestream with synthetic scene insertion. The flow 100 includes rendering a prerecorded livestream 110 that features a host and is viewed by one or more viewers. A livestream is a streaming media event that is simultaneously recorded and broadcast in real time over the Internet. It can include audio, video, or both at the same time. Livestreaming can include a wide variety of topics, including sporting events, video games, artistic performances, marketing campaigns, political speeches, advertising presentations, and so on. Once recorded, the livestream event can be replayed and expanded as viewers comment and interact with the replay of the livestream event in real time.

In some embodiments, the prerecorded livestream can be produced from a synthesized short-form video that can include a synthesized version of a host. Synthesized videos are created using a generative model. Generative models are a class of statistical models that can generate new data instances. The generative model can include a generative adversarial network (GAN). A generative adversarial network (GAN) includes two parts. A generator learns to generate plausible data. The generated instances are input to a discriminator. The discriminator learns to distinguish the generator's fake data from real data. The discriminator penalizes the generator for generating implausible results. During the training process, over time, the output of the generator improves and the discriminator has less success distinguishing real output from fake output. The generator and discriminator can be implemented as neural networks, with the output of the generator connected to the input of the discriminator. Embodiments may utilize backpropagation to create a signal that the generator neural network uses to update its weights.

The discriminator may use training data coming from two sources, real data, which can include images of real objects (the host of the livestream, objects, etc.), and fake data, which are images created by the generator. The discriminator uses the fake data as negative examples during the training process. A discriminator loss function is used to update weights via backpropagation for discriminator loss when it misclassifies an image. The generator learns to create fake data by incorporating feedback from the discriminator. Essentially, the generator learns how to "trick" the discriminator into classifying its output as real. A generator loss function is used to penalize the generator for failing to trick the discriminator. Thus, in embodiments, the generative adversarial network (GAN) includes two separately trained networks. The discriminator neural network can be trained first, followed by training the generative neural network, until a desired level of convergence is achieved. In embodiments, multiple images of a livestream host may be used to create a synthesized short-form video that replaces the original individual's performance in the short-form video with a performance by the synthesized host.

The flow 100 includes accessing, by an operator, a video segment 120 that is related to the prerecorded livestream, wherein the video segment includes a performance by an individual. In embodiments, the performance of the individual can highlight a product or subject matter discussed by the host of the prerecorded livestream. The video segments can be selected from a library of videos made available to the operator. In some embodiments, the accessing can include accessing a second video segment 122 that is related to the prerecorded livestream, wherein the second video segment includes a second performance by the individual or by a second individual. As with the first video segment, the second video segment can be related to the livestream based on highlighted products or subject matter. In some embodiments, the operator can be an artificial intelligence "operator". In other embodiments, an artificial intelligence operator can assist a human operator. The human or AI operator can use voice comments or text generated by viewers during a livestream or livestream replay. Selection of synthesized video segments can be accomplished in response to the viewer comments and questions.

The flow 100 includes retrieving an image 130 of the host of the prerecorded livestream 110. In embodiments, one or more images of the host can be retrieved from the prerecorded video and from other sources, including short-form videos and still photographs. Using a machine learning artificial intelligence (AI) neural network, the images of the host can be used to create a 3D model of the host, including facial expressions, gestures, articles of clothing, accessories, and so on. The various components of the 3D model can be isolated and swapped out as desired, so that a product for sale or alternate article of clothing can be included in a synthesized video using the 3D model. As discussed above and throughout, a 3D model of the host can be built using a generative model. The generative model can include a generative adversarial network (GAN). A generative adversarial network (GAN) includes two parts. A generator learns to generate plausible data using digital images of the host as input. The generated instances are input to a discriminator. The discriminator learns to distinguish the generator's fake data from real data by comparing the generated facial features to the facial features of the host. The discriminator penalizes the generator for generating implausible results. During the training process, over time, the output of the generator improves, and the discriminator has less success distinguishing real output from fake output. Once the fake output of the livestream host is sufficiently plausible, it can be used in the creation of synthesized video segments.

The flow 100 includes creating, from the video segment that was accessed, a synthesized video segment 140, including the performance accomplished by the host of the prerecorded livestream. As described above, the 3D model of the prerecorded livestream host created from retrieved images 130 can be used to replace the performance of the individual presenter in the video segment or segments that were accessed by the livestream operator. The resulting synthesized video segment 140 can be recorded for future use by the operator or rendered to livestream viewers in real time as the prerecorded livestream is played. In some embodiments, the creating further comprises generating, from the second video segment 122, a second synthesized video segment 124, including the second performance accomplished by the host of the prerecorded livestream. The process used to create the second video segment is the same as that used for the first video segment. The synthesized video segments can include deep fake material and synthesized audio, including a synthesized voice for the host based on a voiceprint from the host. Deep fake material is synthesized video that contains elements that have been generated by AI machine learning models as well as recorded video elements. In some embodiments, the AI generated elements can include performances by individuals that have been replaced by the livestream host in the same manner as described above and throughout. The synthesized voice can include AI-generated speech.

Replacing the voice of the individual performing in a video segment with the voice of the livestream host is accomplished in a similar manner to the swapping of the image of the individual with that of the host. In embodiments, an imitation-based algorithm takes the spoken voice of the individual in a video segment as input to a voice conversion module. A neural network, such as a Generative Adversarial Network (GAN), can be used to record the style, intonation, and vocal qualities of both the livestream host and the video segment individual, convert them into linguistic data, and use the characteristics of the host voice to repeat the text of the individual performer in a video segment. For example, the individual performing in the video segment can say the phrase, "My name is Joe." The phrase can be recorded and analyzed. The text of the phrase can be processed along with the vocal characteristics of speed, inflection, emphasis, and so on. The text and vocal characteristics can then be replayed using the style, intonation, and vocal inflections of the livestream host without changing the text, speed, or emphases of the video segment individual's statement. Thus, the same phrase, "My name is Joe," is heard in the voice of the livestream host. The GAN processing can be used to incrementally improve the quality of the livestream host's voice by comparing it to recordings of the host. As more data on the livestream host's voice is collected and used to generate speech, the ability to mimic the voice improves.

The flow 100 includes determining at least one insertion point 150 within the prerecorded livestream 110 for the one or more synthesized video segments 140. In embodiments, the determining of at least one insertion point is accomplished by analyzing the prerecorded livestream. The analyzing is done by AI machine learning and can include detecting one or more words spoken by the host and/or one or more actions of the host; assessing the body position of the host; determining one or more voice inflections of the host; and/or detecting one or more subject matters discussed by the host. The object of the analysis is to identify specific points in the prerecorded livestream where the synthesized video segment can be added into the real-time replay seamlessly, so that the viewers are unaware of the transition from the livestream replay to the synthesized video. In some embodiments, the determining of the insertion point can form a response to the interaction of viewers of the prerecorded livestream. As the livestream is played, viewers can ask for more information about a product for sale that is highlighted by the host, can interact on a particular subject being discussed by the host, etc. If a viewer completes a purchase, donates, or signs up for a promotion, the operator can insert a recognition by the host using a synthesized video segment. AI-generated speech can be used to add the username of the viewer as provided in a text interaction during the livestream event, etc.

The flow 100 includes inserting, by the operator, the synthesized video segment 160 into the prerecorded livestream at the at least one insertion point, wherein the livestream operator dynamically completes the inserting. In embodiments, inserting the synthesized video segment is accomplished by stitching the synthesized video segment into the prerecorded livestream at the one or more insertion points. Video stitching is the process of combining two or more videos so that they play one after the other without a noticeable transition from one video to the next. In embodiments, the synthesized video segment can be inserted into the midst of the prerecorded livestream at a determined insertion point. At the end of the synthesized video, the remainder of the livestream is rendered and continues to play. For example, a prerecorded livestream can include a series of frames A, B, C, D, E. A synthesized video segment can include a series of frames L, M, N. The livestream operator selects frame C as the insertion point for the synthesized video segment. The result of the insertion process is the series of frames A, B, C, L, M, N, D, E. The stitching occurs at one or more boundary frames at the one or more insertion points between the synthesized video and the prerecorded livestream. In this example, a stitched frame C1 and another stitched frame N1 can be created by the stitching process as needed. The stitching process may use copies of frames from other points in the livestream or synthesized video. It may repeat frames within either video or delete frames as needed in order to produce the least noticeable transition from the livestream to the synthesized video. The resulting video in this example can thus be A, B, C, C1, C2, L, M, N, N1, B, D, E.

In some embodiments, the stitching can include differentiating an object from a background. The stitching can include removing or adding the object from the synthesized video segment or the prerecorded livestream. For example, the background of the prerecorded livestream may not include a clock on the wall behind the host, while the background of the synthesized video segment includes a clock. The stitching process can isolate and remove the clock from the synthesized video segment prior to inserting it into the livestream. The reverse can also be true, in which a clock is on the wall behind the host in the livestream but not in the synthesized video. The stitching process can isolate the clock from the prerecorded livestream and insert it into the synthesized video segment so that it appears in the correct position on the wall and the time on the clock does not jump ahead or behind as the transition to the video segment is completed.

In some embodiments, the stitching can include restoring a corrupt video frame. The restoring of a corrupt video frame can include evaluating one or more video frames before and after the corrupt video frame. The contents of the video frames before and after the corrupt video frame can be used to synthesize a new frame to replace the corrupt frame so that the viewer does not notice an interruption in the prerecorded livestream or the synthesized video segment.

In some embodiments, the stitching can include deleting a frame of the prerecorded livestream. Deleting one or more frames of the livestream video may be required to make the least noticeable transition from the livestream to the synthesized video. For example, the last statement of the host in the livestream may be the same as, or similar to, the first statement of the synthesized video segment to be inserted. The livestream operator can determine that the best stitching insertion option is to delete the last statement of the host in the livestream prior to the insertion point, so that the same statement is made by the host at the beginning of the synthesized video segment. In some embodiments, the inserted synthesized video segment becomes the response to an interaction by one or more viewers of the prerecorded livestream. The inserting process can include a second synthesized video segment as more comments or questions from viewers occur during a livestream event. The synthesized video segments can include images 162 relevant to a subject matter discussed by the host or videos 164 relevant to a subject matter discussed by the host.

The flow 100 includes rendering the remainder 170 of the prerecorded livestream after the synthesized video segment insertion point. As discussed above and throughout, the stitching process used to create a seamless transition from the prerecorded livestream to the synthesized video segment can be used to create another seamless transition from the end of the synthesized video segment to the remainder of the prerecorded livestream.

The flow 100 includes enabling an ecommerce purchase 180 during the rendering of the prerecorded livestream. In embodiments, the livestream host can highlight products and services for sale during the livestream event. The host can demonstrate, endorse, recommend, and otherwise interact with one or more products for sale. An ecommerce purchase of at least one product for sale can be enabled to the viewer, wherein the ecommerce purchase is accomplished within the livestream window. As the host interacts with and presents the products for sale, a product card can be included within a livestream shopping window. An ecommerce environment associated with the livestream event can be generated on the viewer's mobile device or other connected television device as the event progresses. The ecommerce environment on the viewer's mobile device can display the livestream event and the ecommerce environment at the same time. The mobile device user can interact with the product card in order to learn more about the product with which the product card is associated. While the user is interacting with the product card, the livestream event continues to play. Purchase details of the at least one product for sale are revealed, wherein the revealing is rendered to the viewer. The viewer can purchase the product through the ecommerce environment, including a virtual purchase cart 182. The viewer can purchase the product without having to "leave" the livestream event. Leaving the livestream event can include having to disconnect from the event, open an ecommerce window separate from the livestream event, and so on. The livestream event can continue while the viewer is engaged with the ecommerce purchase. In embodiments, the livestream event can continue "behind" the ecommerce purchase window, where the virtual purchase window can obscure or partially obscure the livestream event. In some embodiments, the synthesized video segment that was rendered displays the virtual product cart while the synthesized video segment plays. The virtual product cart can cover a portion of the synthesized video segment while it plays.

The flow 100 includes a virtual purchase cart 182 rendered to the viewer during a livestream event. The virtual purchase cart can appear as an icon, a pictogram, a representation of a purchase cart, and so on. The virtual purchase cart can appear as a cart, a basket, a bag, a tote, a sack, and the like. Using a mobile phone or other connected television (CTV) device, such as a smart TV; a television connected to the Internet via a cable box, TV stick, or game console; pad; tablet; laptop or desktop computer; etc., the viewer can click on the product or on the virtual purchase cart to add the product to the purchase cart. The viewer can click again on the virtual purchase cart to open the cart and display the cart contents. The viewer can save the cart, edit the contents of the cart, delete items in the cart, etc. In some embodiments, the virtual purchase cart rendered to the viewer can cover a portion of the livestream window. The portion of the livestream window can range from a small portion to substantially all of the livestream window. In some embodiments, the synthesized video segment can display the virtual product cart while the synthesized video segment plays. The virtual product cart can cover a portion of the synthesized video segment while it plays. However much of the livestream window is covered by the virtual purchase cart, the livestream event continues to play while the viewer is interacting with the virtual purchase cart. Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors.

Figure 2:
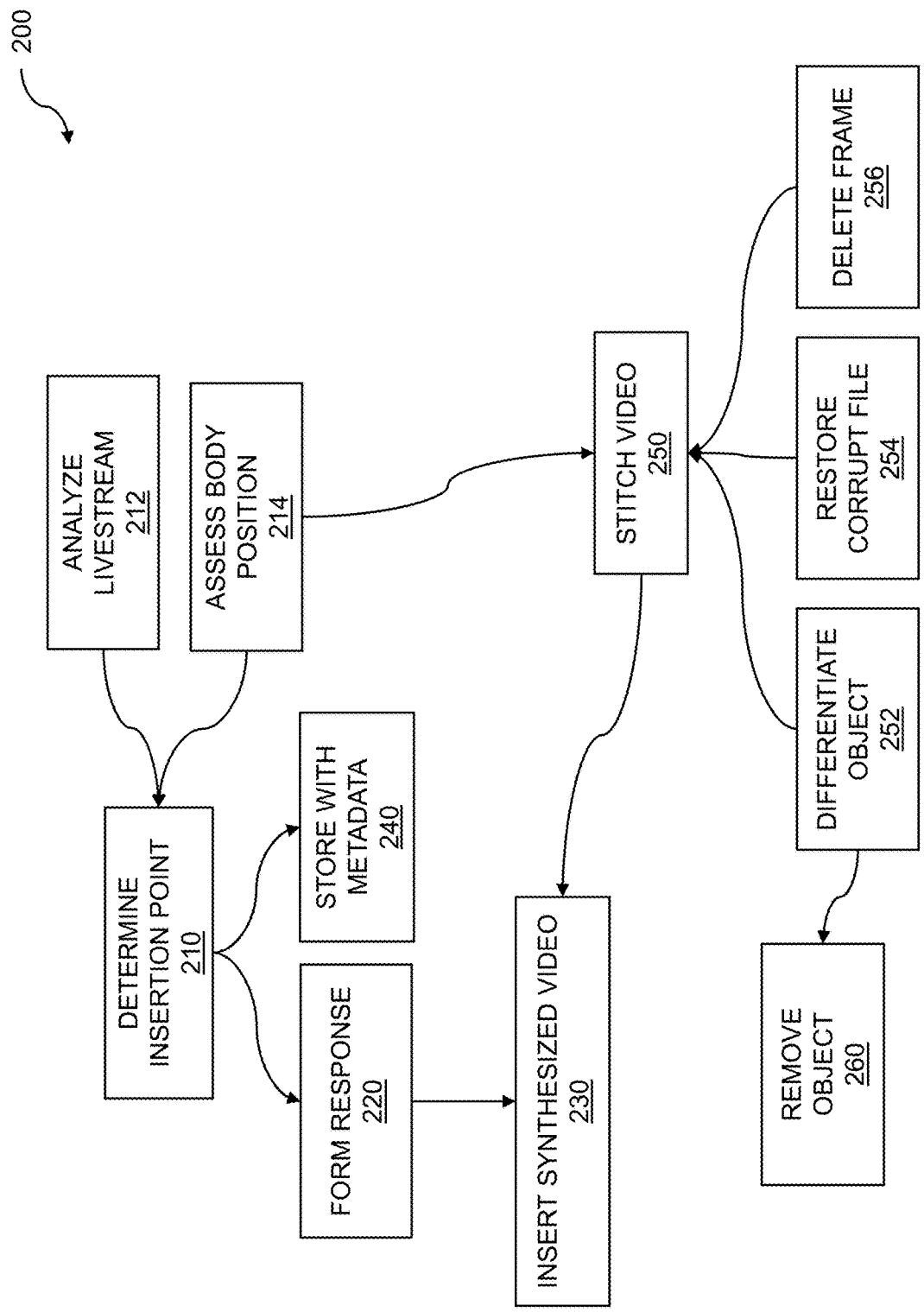
FIG. 2 is a flow diagram for assessing a livestream for synthetic scene insertion.

FIG. 2 is a flow diagram 200 for assessing a livestream for synthetic scene insertion. A prerecorded livestream can be analyzed to determine insertion points for placing synthesized video segments into the livestream event. The insertion points can be determined based on words spoken by the host, actions taken by the host, voice inflections of the host, subjects discussed by the host, body positions of the host, and so on. The livestream operator can select the insertion point based on the comments and questions raised by viewers during the livestream event, so that the synthesized video segment becomes the response to the viewer comment or question. The insertion of the synthesized video segment can be accomplished dynamically and can appear seamless to the viewer. The insertion of the synthesized video segment can be accomplished by stitching the segment into the livestream event at one of the determined insertion points. One or more boundary frames can be identified in the prerecorded livestream and the synthesized video segment and can be used to smooth the transition from the livestream to the video segment. The stitching component can insert or remove one or more frames from the beginning or end of the video segment or from the boundary frames of the livestream in order to make the transition from one to the other seamless. Objects that appear in the livestream background that are not in the synthesized video segment can be isolated and inserted into the video segment in the same relative location. Objects that appear in the video segment that are not in the livestream can be removed as well. At the end of the synthesized video segment, boundary frames can be used to smooth the transition back to the remainder of the prerecorded livestream. Multiple synthesized video segments can be generated and inserted into the prerecorded livestream in order to respond to viewer comments and questions as they arise during the livestream replay.

The flow 200 includes determining at least one insertion point 210 within the prerecorded livestream, wherein the synthesized video segment includes the performance accomplished by the host. In embodiments, the determining of the at least one insertion point can comprise forming a response 220 to an interaction by the one or more viewers of the prerecorded livestream. As discussed above and throughout, synthesized video segments can include the voice and visible features of the livestream host as the performer of the video segments. In some embodiments, the synthesized video segments can be inserted by a livestream operator into the prerecorded livestream to add or replace comments made by the host or others in the livestream. The synthesized video segments can be used to present more information about a product for sale or to present additional products for sale based on questions or comments made by the host or by viewers of the livestream. The synthesized video segments can be used to recognize or encourage viewers who purchase products for sale, donate to a fundraising effort, enroll in a class, etc. AI-generated speech using the host's voice can be added to personalize comments made to the viewer as part of the synthesized video segment. The addition of the synthesized video segments can enhance the experience of the viewers as the prerecorded livestream is rendered. The viewers can be directly engaged with responses to their comments, questions, and other interactions in real time as the livestream operator inserts the synthesized video segments.

The flow 200 includes analyzing the prerecorded livestream 212 to determine at least one insertion point 210 for a synthesized video segment. In embodiments, the analyzing can include detecting one or more words spoken by the host, one or more actions of the host, one or more voice inflections of the host, and/or one or more subject matters discussed by the host; and assessing the body position of the host 214. As in film editing, the determining of insertion points can be based on replicating what a viewer in a theater, attending a movie, or watching television does naturally. The closer the insertion point matches the exact moment when a viewer expects an answer to a question or a response to a comment, to see a product in use, or to view a close-up the host's face, etc., the more invisible the transition from the livestream to the inserted video segment will be. The second element of determining the insertion point is making sure that the tone values and scene arrangement of the last frame of the livestream match, as nearly as possible, the tone values and scene arrangement of the first frame of the inserted video segment. For example, the transition to a synthesized video segment can include a view of a product for sale in the first few frames of the video segment, followed by a view of the host performing the remainder of the video segment in the same setting as that of the prerecorded livestream. Today's media viewers are accustomed to a still view of a product lasting two to three seconds as a host voice speaks about the product in commercial advertising, livestream events, and in-home shopping network segments. Selecting a point in a prerecorded livestream where the host begins to speak about a product for sale can provide a likely spot for inserting a synthesized video segment with more information about the product. After the still view of the product is complete, the synthesized video segment can continue with a view of the host in the same setting as before the insertion of the video segment. The viewer continues to watch the synthesized video segment without noticing the transition from the prerecorded livestream to the video segment.

The analyzing of the prerecorded livestream 212 to determine insertion points 210 can be accomplished by an artificial intelligence (AI) machine learning neural network. In some embodiments, the insertion points can be located in the prerecorded livestream using a generative model. The generative model can include a generative adversarial network (GAN). A generative adversarial network (GAN) includes two parts. A generator learns to generate plausible insertion points in a prerecorded livestream. The generated instances are input to a discriminator. The discriminator learns to distinguish the generator's fake data from real data. The real data can come from a set of video segment insertions completed by a professional editor. The data can include the actions and body position of the host in the video frames just prior to the insertion point; the text, subject matter, and vocal inflections of the host's voice just prior to the insertion point; and so on. The discriminator penalizes the generator for generating implausible results. During the training process, over time, the output of the generator improves, and the discriminator has less success distinguishing real output from fake output. The generator and discriminator can be implemented as neural networks, with the output of the generator connected to the input of the discriminator. Embodiments may utilize backpropagation to create a signal that the generator neural network uses to update its weights.

The discriminator may use training data coming from two sources, real data, which can include insertion points in the prerecorded livestream selected by one or more professional editors, and fake data, which comprises insertion points identified by the generator. The discriminator uses the fake data as negative examples during the training process. A discriminator loss function is used to update weights via backpropagation for discriminator loss when it misidentifies an insertion point. The generator learns to create fake data by incorporating feedback from the discriminator. Essentially, the generator learns how to "trick" the discriminator into classifying its output as real. A generator loss function is used to penalize the generator for failing to trick the discriminator. Thus, in embodiments, the generative adversarial network (GAN) includes two separately trained networks. The discriminator neural network can be trained first, followed by training the generative neural network, until a desired level of convergence is achieved. In embodiments, multiple prerecorded livestreams and synthesized video segments may be used to generate a set of acceptable insertion points. In embodiments, the at least one insertion point can be stored with metadata 240 associated with the prerecorded livestream.

The flow 200 includes a livestream operator inserting the synthesized video segment 230 into the prerecorded livestream at the determined insertion point 210. The inserting is accomplished dynamically and appears seamless to the viewer. In embodiments, the inserting the synthesized video segment 230 further comprises stitching the synthesized video segment 250 into the prerecorded livestream at the one or more insertion points. As in the determining of the insertion point 210, the actions and body position 214, and the subject matter, text, and vocal inflections of the livestream host can all be used to determine the video frames used in the stitching process. In embodiments, the stitching can comprise differentiating an object 252 from a background. Objects in the background or in the foreground of the prerecorded livestream can be different from those in the synthesized video segment to be inserted. For example, the background of the prerecorded livestream may not include a clock on the wall behind the host, while the background of the synthesized video segment includes a clock. The stitching process can isolate and remove objects 260, such as a clock, from the synthesized video segment prior to inserting it into the livestream. The reverse can also be true, in which a clock is on the wall behind the host in the livestream but not in the synthesized video. The stitching process can isolate the clock from the prerecorded livestream and insert it into the synthesized video segment so that it appears in the correct position on the wall and the time on the clock does not jump ahead or behind as the transition to the video segment is completed.

The stitching can include restoring a corrupt video file 254, including evaluating one or more video frames before and after the corrupt video frame. In embodiments, the contents of the video frames before and after the corrupt video frame can be used to synthesize a new frame to replace the corrupt frame so that the viewer does not notice an interruption in the prerecorded livestream or the synthesized video segment. The stitching can also include deleting 256 one or more frames of the prerecorded livestream. Deleting one or more frames of the livestream video may be required to make the least noticeable transition from the livestream to the synthesized video. For example, the last statement of the host in the livestream may be the same as, or similar to, the first statement of the synthesized video segment to be inserted. The livestream operator can determine that the best stitching insertion option is to delete the last statement of the host in the livestream prior to the insertion point, so that the same statement is made by the host at the beginning of the synthesized video segment. In some embodiments, the inserted synthesized video segment becomes the response to an interaction by one or more viewers of the prerecorded livestream. The inserting process can include a second synthesized video segment as more comments or questions from viewers occur during a livestream event.

Various steps in the flow 200 may be changed in order, repeated, omitted, or the like without departing from the disclosed concepts. Various embodiments of the flow 200 can be included in a computer program product embodied in a non-transitory computer readable medium that includes code executable by one or more processors.

Figure 3:
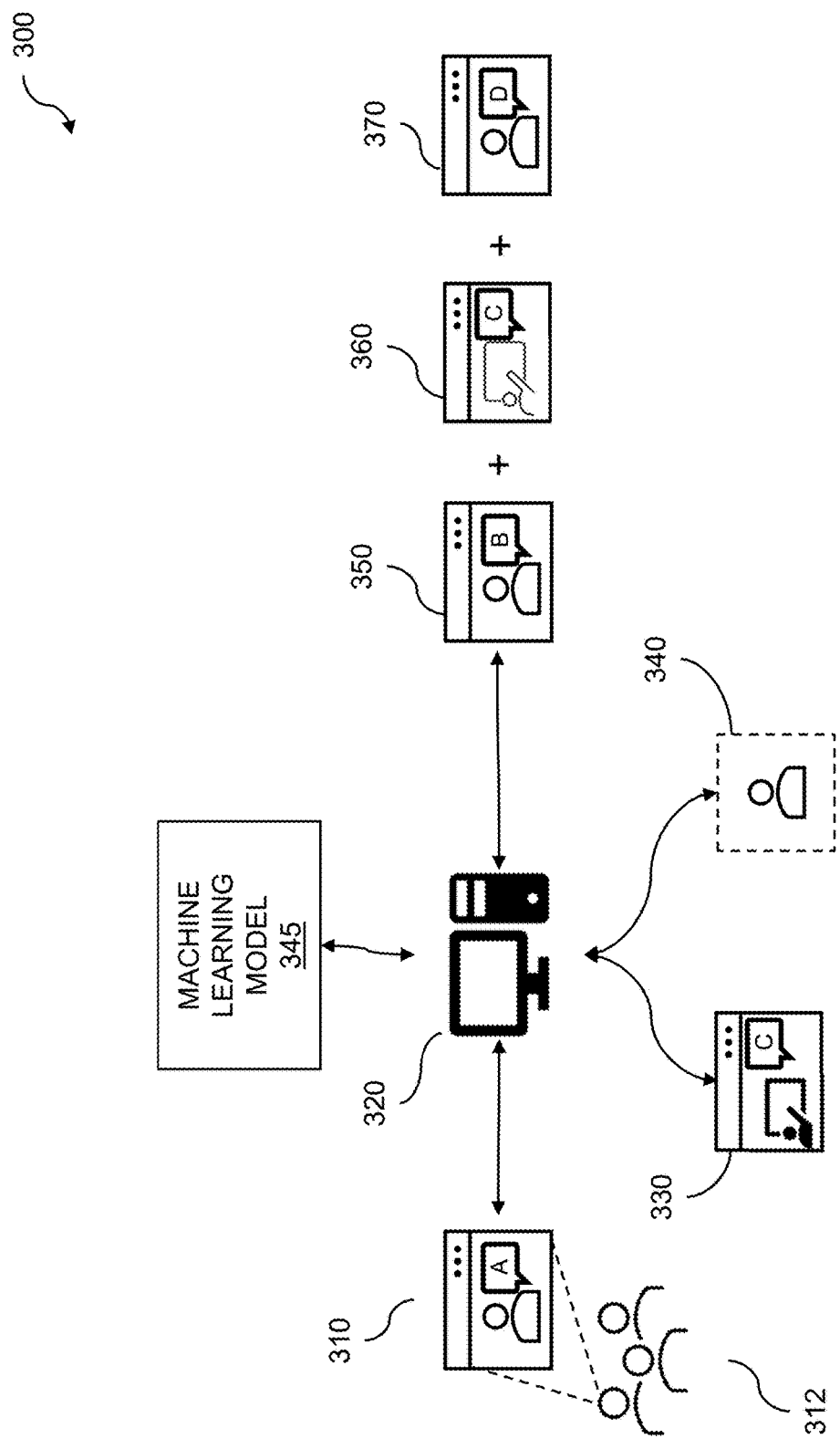
FIG. 3 is an infographic for a livestream with synthetic scene insertion.

FIG. 3 is an infographic 300 for a livestream with synthetic scene insertion. A prerecorded livestream event can be accessed and presented to a group of viewers. The replay of the livestream can be accessed by viewers in real time, allowing interaction between viewers and operators of the livestream. Short-form video segments related to products and subjects discussed during the livestream can be accessed by the operator of the prerecorded livestream. The video segments can be selected based on comments or questions raised by viewers during the livestream event in addition to segments preselected based on subjects and products discussed in the livestream. The individual performing in the video segments can be a different presenter from the host of the prerecorded livestream. Images of the livestream host can be collected and combined using artificial intelligence (AI) machine learning to create a 3D model of the host, including facial features, expressions, gestures, clothing, accessories, etc. The 3D model of the host can be combined with the video segments to create synthesized video segments in which the livestream host is seen as the presenter. AI machine learning can be used to swap the voice of the video segment individual presenter with the voice of the livestream host. Thus, the host of the prerecorded livestream becomes the presenter of the synthesized video segments for the viewers.

The prerecorded livestream can be analyzed to determine insertion points for the synthesized video segments into the livestream event. The livestream operator can select the insertion point based on the comments and questions raised by viewers during the livestream event, so that the synthesized video segment becomes the response to the viewer comment or question. The insertion of the synthesized video segment can be accomplished dynamically to appear seamless to the viewer. The insertion of the synthesized video segment can be accomplished by stitching the segment into the livestream event at one of the determined insertion points. One or more boundary frames can be identified in the prerecorded livestream and the synthesized video segment and can be used to smooth the transition from the livestream to the video segment. At the end of the synthesized video segment, boundary frames can be used to smooth the transition back to the remainder of the prerecorded livestream.

The infographic 300 includes viewers 312 watching a prerecorded livestream 310. A livestream is a streaming media event that is simultaneously recorded and broadcast in real time over the Internet. It can include audio, video, or both at the same time. Livestreaming can include a wide variety of topics including sporting events, video games, artistic performances, marketing campaigns, political speeches, advertising presentations, and so on. Once recorded, the livestream event can be replayed and expanded as viewers comment and interact with the replay of the livestream event in real-time.

The infographic 300 includes an operator 320 that can monitor the livestream event as viewers 312 watch and interact with the prerecorded livestream. In embodiments, the operator can listen to verbal comments made by viewers, see comments and questions made by viewers in a chat associated with the livestream, and so on. The operator 320 can access an artificial intelligence (AI) machine learning model 345 and a library of related short-form video segments 330. The operator can use video segments to respond to the interaction of viewers as the prerecorded livestream is rendered.

The infographic 300 includes a video segment 330 that is related to the prerecorded livestream, wherein the video segment includes a performance by an individual. In embodiments, the performance of the individual can highlight a product or subject matter discussed by the host of the prerecorded livestream 310. The video segments 330 can be selected from a library of videos made available to the operator. In some embodiments, the accessing can include accessing a second video segment that is related to the prerecorded livestream, wherein the second video segment includes a second performance by the individual or by a second individual. As with the first video segment, the second video segment can be related to the livestream based on highlighted products or subject matter.

The infographic 300 includes one or more images of the livestream host 340. In embodiments, one or more images of the host can be retrieved from the prerecorded video and from other sources, including short-form videos and still photographs. Using a machine learning artificial intelligence (AI) neural network, the images of the host can be used to create a 3D model of the host, including facial expressions, gestures, articles of clothing, accessories, and so on. The various components of the 3D model can be isolated and swapped out as desired, so that a product for sale or alternate article of clothing can be included in a synthesized video using the 3D model. As discussed above and throughout, the 3D model of the host can be built using a generative model. The generative model can include a generative adversarial network (GAN). A generative adversarial network (GAN) includes two parts. A generator learns to generate plausible data using digital images of the host as input. The generated instances are input to a discriminator. The discriminator learns to distinguish the generator's fake data from real data by comparing the generated facial features to the facial features of the host. The discriminator penalizes the generator for generating implausible results. During the training process, over time, the output of the generator improves, and the discriminator has less success distinguishing real output from fake output. Once the fake output of the livestream host is sufficiently plausible, it can be used in the creation of synthesized video segments. Thus, the images of the livestream host 340 can be combined with the video segment 330 to create a synthesized video segment 360 in which the livestream host renders the performance of the individual in the video segment 330.

The infographic 300 includes the operator 320 using an AI machine learning model 345 to dynamically insert a synthesized video segment 360 into the prerecorded livestream 350. In embodiments, the inserting of the synthesized video segment 360 forms a response to questions or comments made by viewers 312 as the prerecorded livestream 310 is rendered. The determining of at least one insertion point is accomplished by analyzing the prerecorded livestream 350. An AI machine learning model can analyze the livestream and can include detecting one or more words spoken by the host and/or one or more actions of the host; assessing the body position of the host; determining one or more voice inflections of the host; detecting one or more subject matters discussed by the host; etc. The object of the analysis is to determine specific points in the prerecorded livestream where the synthesized video segment can be added into the real-time replay seamlessly, so that the viewers are unaware of the transition from the livestream replay to the synthesized video. In embodiments, inserting the synthesized video segment 360 is accomplished by stitching the synthesized video segment into the prerecorded livestream 350 at the one or more insertion points. Video stitching is the process of combining two or more videos so that they play one after the other without a noticeable transition from one video to the next. At the end of the synthesized video segment 360, the remainder of the livestream can continue to play. For example, a prerecorded livestream 350 can include a series of frames A, B, C, D, E. A synthesized video segment 360 can include a series of frames L, M, N. The livestream operator 320 selects frame C of the prerecorded livestream 350 as the insertion point for the synthesized video segment 360. The result of the insertion process is the series of frames A, B, C, L, M, N, D, E. The stitching occurs at one or more boundary frames at the one or more insertion points, between the synthesized video segment 360 and the prerecorded livestream 350. In this example, a stitched frame C1 and another stitched frame N1 can be generated by the stitching process as needed. The stitching process may use copies of frames from other points in the prerecorded livestream 350 or the synthesized video segment 360. It may repeat frames within either video or delete frames as needed in order to produce the least noticeable transition from the livestream to the synthesized video. The resulting video in this example can thus be A, B, C, C1, C2, L, M, N, N1, B, D, E.

The infographic 300 includes rendering the remainder 370 of the prerecorded livestream after the synthesized video segment 360 insertion. As discussed above and throughout, the stitching process used to create a seamless transition from the prerecorded livestream 350 to the synthesized video segment 360 can be used to create another seamless transition from the end of the synthesized video segment 360 to the remainder of the prerecorded livestream 370.

Figure 4:
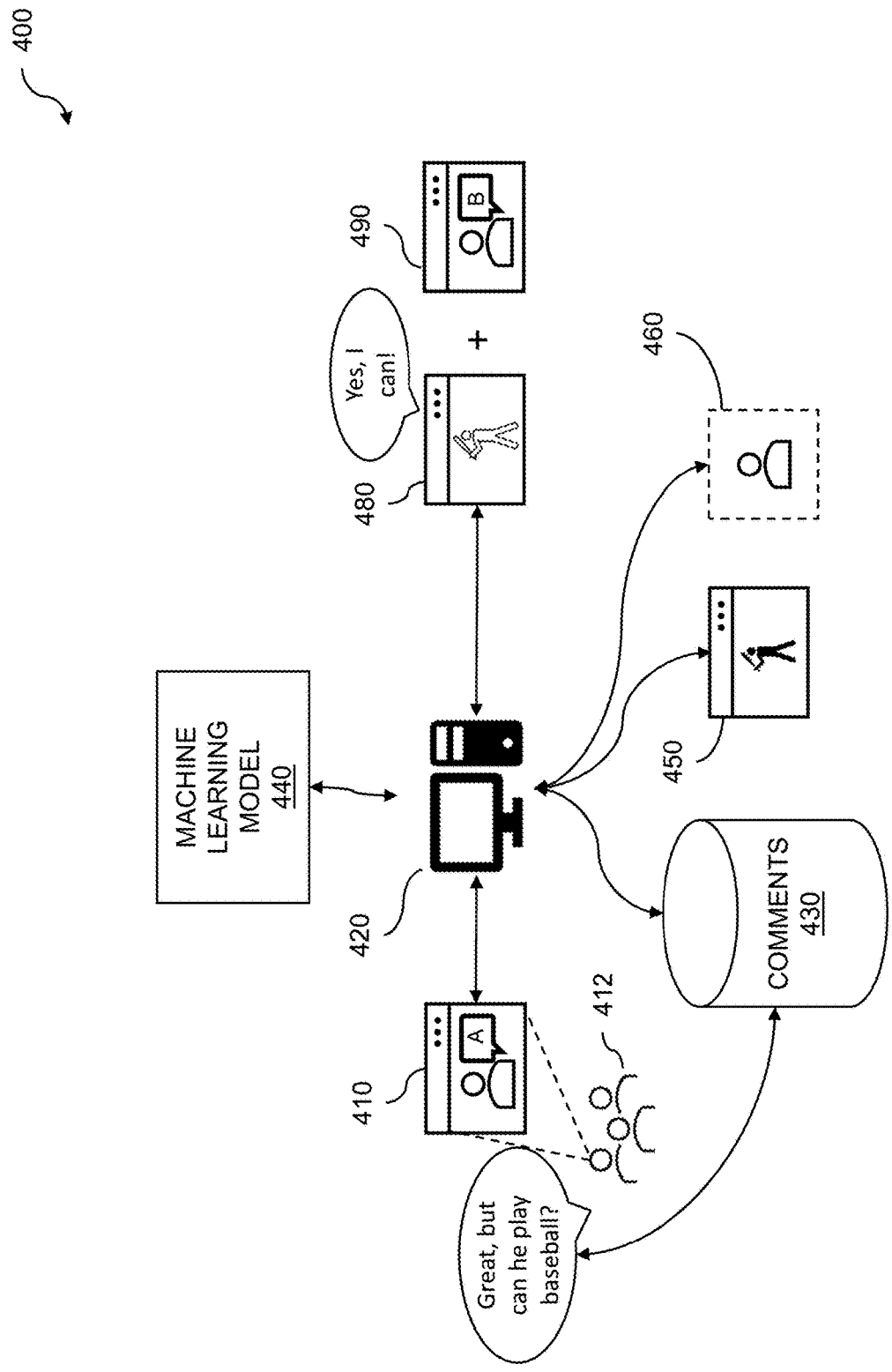
FIG. 4 is an infographic for a livestream with synthetic scene insertion based on viewer interaction.

FIG. 4 is an infographic 400 for a livestream with synthetic scene insertion based on viewer interaction. A prerecorded livestream event can be accessed and presented to a group of viewers. The replay of the livestream can be accessed by viewers in real time, allowing interaction between viewers and operators of the livestream. Short-form video segments related to products and subjects discussed during the livestream can be accessed by the operator of the prerecorded livestream. The video segments can be selected based on comments or questions raised by viewers during the livestream event in addition to preselected segments based on subjects and products discussed in the livestream. The individual performing in the video segments can be a different presenter from the host of the prerecorded livestream. Images of the livestream host can be collected and combined using artificial intelligence (AI) machine learning to create a 3D model of the host, including facial features, expressions, gestures, clothing, accessories, etc. The 3D model of the host can be combined with the video segments to create synthesized video segments in which the livestream host is seen as the presenter. AI machine learning can be used to swap the voice of the video segment individual presenter with the voice of the livestream host. Thus, the host of the prerecorded livestream becomes the presenter of the synthesized video segments for the viewers.

The prerecorded livestream can be analyzed to determine insertion points for the synthesized video segments into the livestream event. The livestream operator can select the insertion point based on the comments and questions raised by viewers during the livestream event, so that the synthesized video segment becomes the response to the viewer comment or question. The insertion of the synthesized video segment can be accomplished dynamically and can appear seamless to the viewer. The insertion of the synthesized video segment can be accomplished by stitching the segment into the livestream event at one of the determined insertion points. One or more boundary frames can be identified in the prerecorded livestream and the synthesized video segment and can be used to smooth the transition from the livestream to the video segment. At the end of the synthesized video segment, boundary frames can be used to smooth the transition back to the remainder of the prerecorded livestream.

The infographic 400 includes viewers 412 watching a prerecorded livestream 410. A livestream is a streaming media event that is simultaneously recorded and broadcast in real time over the Internet. It can include audio, video, or both at the same time. Livestreaming can include a wide variety of topics, including sporting events, video games, artistic performances, marketing campaigns, political speeches, advertising presentations, and so on. Once recorded, the livestream event can be replayed and expanded upon as viewers comment and interact with the replay of the livestream event in real time.

The infographic 400 includes an operator 420 that can monitor the livestream event as viewers 412 watch and interact with the prerecorded livestream 410. In embodiments, the operator 420 can listen to verbal comments 430 made by viewers 412, see comments and questions 430 made by viewers in a chat associated with the livestream, and so on. The operator 420 can access an artificial intelligence (AI) machine learning model 440 and a library of related short-form video segments 450. The operator can use the video segments 450 to respond to the comments 430 of viewers 412 as the prerecorded livestream 410 is rendered. For example, the comment, "Great, but can he play baseball?" can be made by a viewer 412 as the prerecorded livestream 410 is rendered for the viewers 412. The comment can be recorded 430 and accessed by the livestream operator 420. The livestream operator can access a library of related video segments 450 and select a video segment that includes an individual playing baseball.

The infographic 400 includes one or more images of the livestream host 460. In embodiments, one or more images of the host 460 can be retrieved from the prerecorded video and from other sources, including short-form videos and still photographs. Using machine learning artificial intelligence (AI) 440, the images of the host 460 can be used to create a 3D model of the host, including facial expressions, gestures, articles of clothing, accessories, and so on. The various components of the 3D model can be isolated and swapped out as desired, so that a product for sale or alternate article of clothing can be included in a synthesized video using the 3D model. As discussed above and throughout, the 3D model of the host can be built using a generative model. The generative model can include a generative adversarial network (GAN). Using the GAN, the images of the livestream host 460 can be combined with the video segments 450 to create a synthesized video segment 480 in which the livestream host renders the performance of the individual in the video segment.

The infographic 400 includes the operator 420 using an AI machine learning model 440 to dynamically insert a synthesized video segment 480 into the prerecorded livestream 410. In embodiments, the inserting of the synthesized video segment 480 forms a response to comments 430 made by viewers 412 as the prerecorded livestream 410 is rendered. For example, the synthesized video segment that combines the images of the host with the individual playing baseball can be dynamically inserted by the livestream operator. The synthesized video segment 480 forms a response to the viewer question, "Great, but can he play baseball?" An AI-generated voice response, "Yes, I can!", using the voice of the livestream host, can be added to the synthesized video segment 480 by the livestream operator 420 to further enhance the experience of the viewers 412 as the video segment 480 is rendered.

The infographic 400 includes rendering the remainder of the prerecorded livestream 490 after the synthesized video segment 480 insertion. As discussed above and throughout, a stitching process can be used to create a seamless transition from the prerecorded livestream 410 to the synthesized video segment 480. A similar stitching process can be used to create a seamless transition from the end of the synthesized video segment 480 to the remainder of the prerecorded livestream 490. The stitching occurs at one or more boundary frames at the insertion point between the synthesized video segment 480 and the remainder of the prerecorded livestream 490. The stitching process may use copies of frames from other points in the prerecorded livestream 410 or the synthesized video segment 480. It may repeat frames within either video or delete frames as needed in order to produce the least noticeable transition from the livestream to the synthesized video. Thus, the viewers 412 are dynamically engaged as the livestream operator 420 uses synthesized video segments 480 to respond directly to viewer comments 430 as they occur in real time during replay of the prerecorded livestream 410.

Figure 5:
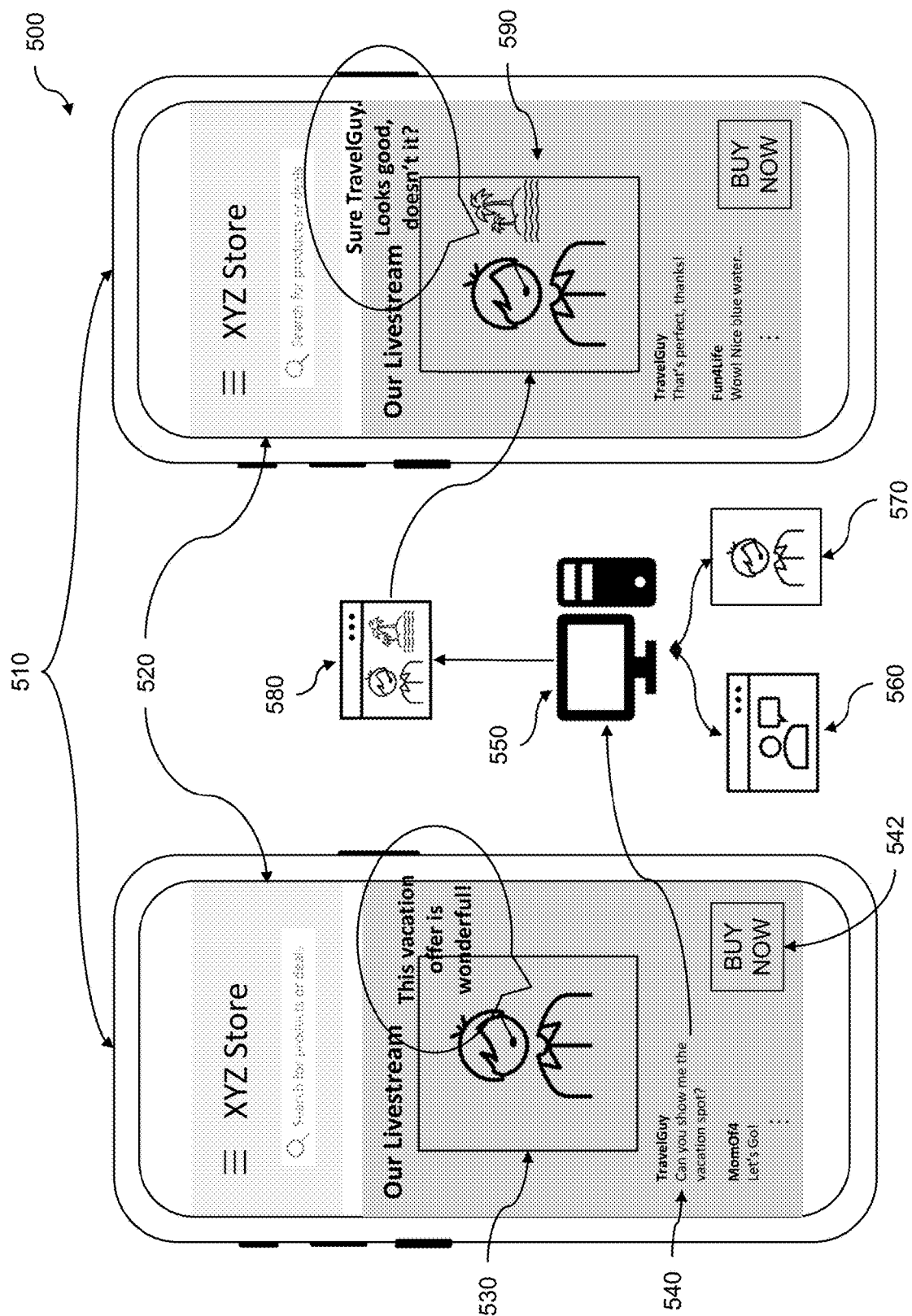
FIG. 5 is an example for determining a response to an interaction.

FIG. 5 is an example 500 for determining a response to an interaction. A prerecorded livestream event can be accessed and presented to a group of viewers. The viewers can watch the livestream on connected television (CTV) devices including smart TVs with built-in internet connectivity, televisions connected to the Internet via set-top boxes, TV sticks, and so on. The replay of the livestream can be accessed by viewers in real time, allowing participation and interaction between viewers and operators of the livestream. Short-form video segments related to products and subjects discussed during the livestream can be accessed by the operator of the prerecorded livestream. The video segments can be selected based on comments or questions raised by viewers during the livestream event in addition to preselected segments based on subjects and products discussed in the livestream. The individual performing in the video segments can be a different presenter from the host of the prerecorded livestream. Images of the livestream host can be collected and combined using artificial intelligence (AI) machine learning to create a 3D model of the host, including facial features, expressions, gestures, clothing, accessories, etc. The 3D model of the host can be combined with the video segments to create synthesized video segments in which the livestream host is seen as the presenter. AI machine learning can be used to swap the voice of the video segment individual presenter with the voice of the livestream host. Thus, the host of the prerecorded livestream becomes the presenter of the synthesized video segments for the viewers. The synthesized video segments and the prerecorded livestream can highlight products for sale during a livestream event.

The example 500 includes a CTV device 510 that can be used to participate in a livestream event 520. A connected television (CTV) is any television set connected to the Internet, including smart TVs with built-in internet connectivity, televisions connected to the Internet via set-top boxes, TV sticks, and gaming consoles. Connected TV can also include Over-the-Top (OTT) video devices or services accessed by a laptop, desktop, pad, or mobile phone. Content for television can be accessed directly from the Internet without using a cable or satellite set-top box.

The example 500 includes a prerecorded livestream 520. A livestream is a streaming media event that is simultaneously recorded and broadcast in real time over the Internet. It can include audio, video, or both at the same time. Once recorded, the livestream event can be replayed and expanded upon as viewers comment and interact with the replay of the livestream event in real time. In embodiments, viewers can participate in the livestream event 520 by accessing a website made available by the livestream host using a CTV device such as a mobile phone, tablet, pad, laptop computer, or desktop computer. Participants in a livestream event can take part in chats 540, respond to polls, ask questions, make comments, and purchase products 542 for sale that are highlighted during the livestream event.

The example 500 includes an operator 550 that can monitor the livestream event 520 as viewers watch and interact with the prerecorded livestream. In embodiments, the operator 550 can see comments and questions made by viewers in a chat 540 associated with the livestream. The operator 550 can access an artificial intelligence (AI) machine learning model and a library of related video segments 560. The operator can use the video segments 560 to respond to the chat comments 540 of viewers as the prerecorded livestream 520 is rendered. For example, a request, "Can you show me the vacation spot?" can be made by a viewer in a livestream chat 540 as the prerecorded livestream 520 is rendered for the viewers. The livestream operator can access a library of related video segments 560 and select a video segment that gives more details about the vacation spot and in some embodiments can include images and short-form videos of the vacation spot.

The example 500 includes replacing the performance of the individual presenter in the video segment 560 with the livestream host 570. In embodiments, one or more images of the livestream host 570 can be retrieved from the prerecorded livestream and from other sources, including short-form videos and still photographs. Using a machine learning artificial intelligence (AI) neural network, the images of the host 570 can be used to create a 3D model of the host, including facial expressions, gestures, articles of clothing, accessories, and so on. The various components of the 3D model can be isolated and swapped out as desired, so that a product for sale or alternate article of clothing can be included in a synthesized video using the 3D model. As discussed above and throughout, the 3D model of the host can be built using a generative model. The generative model can include a generative adversarial network (GAN). Using the GAN, the images of the livestream host 570 can be combined with the video segment 560 to create a synthesized video segment 580 in which the livestream host renders the performance of the individual in the video segment 560.

The example 500 includes inserting a synthesized video segment 580 into the prerecorded livestream. The dynamic inserting of the synthesized video segment 580 can be a response to viewer interactions 540 that occur during the livestream event. The inserting can be done dynamically through the use of an operator 550. In some embodiments, the viewer interactions 540 can be accomplished using polls, surveys, questions and answers, and so on. The responses to viewer comments can be based on products for sale which are highlighted during the livestream performance. For example, in the FIG. 5 infographic, the livestream host 530 says, "This vacation offer is wonderful!" A participant in the livestream responds by asking, "Can you show me the vacation spot?" The operator 550 can dynamically respond to the participant's question 540 by obtaining a video segment 560 that can include an image or short-form video of the product for sale, in this case, the vacation spot. The operator can combine the image of the livestream host 570 with the video segment 560 so that the livestream host can be seen rendering the performance of the individual in the video segment 560. The operator 550 can insert the synthesized video segment 580 into the livestream seamlessly using one or more insertion points determined by the AI machine learning model. The synthesized video segment 590 becomes the response to the question 540 the viewer generated as part of the livestream event. The operator 550 can use an AI machine learning model to reply to the viewer using the livestream host's voice with the comment, "Sure TravelGuy. Looks good, doesn't it?" 590. In some embodiments, the phrase "Sure . . . Looks good, doesn't it?" can be a prerecorded video comment so that the username "TravelGuy" is the only portion of the response that is added dynamically during the livestream event by the operator 550.

Figure 6:
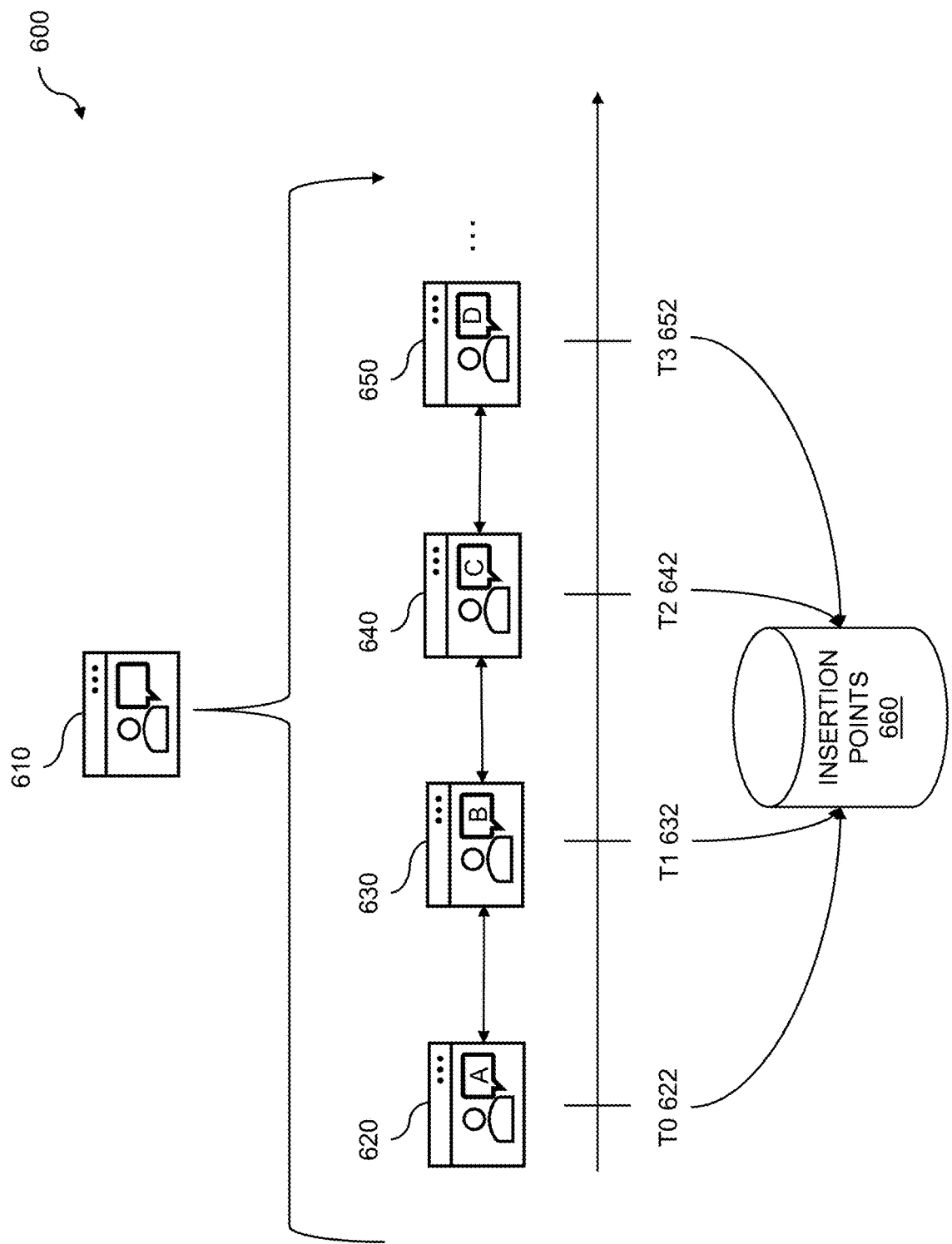
FIG. 6 is an infographic for analyzing a prerecorded livestream.

FIG. 6 is an infographic 600 for analyzing a prerecorded livestream. A prerecorded livestream event can be accessed and presented to a group of viewers. The replay of the livestream can be accessed by viewers in real time, allowing participation and interaction between viewers and operators of the livestream. Short-form video segments related to products and subjects discussed during the livestream can be accessed by the operator of the prerecorded livestream. The video segments can be selected based on comments or questions raised by viewers during the livestream event in addition to segments preselected based on subjects and products discussed in the livestream. A livestream operator can use an AI machine learning model to replace the performance of an individual in the video segments with the face, features, and voice of the livestream host. The prerecorded livestream can be analyzed to determine insertion points for the synthesized video segments into the livestream event. The livestream operator can select the insertion point based on the comments and questions raised by viewers during the livestream event, so that the synthesized video segment becomes the response to the viewer comment or question. The insertion of the synthesized video segment can be accomplished dynamically and can appear seamless to the viewer. The insertion of the synthesized video segment can be accomplished by stitching the segment into the livestream event at one of the determined insertion points. One or more boundary frames can be identified in the prerecorded livestream and the synthesized video segment and can be used to smooth the transition from the livestream to the video segment. At the end of the synthesized video segment, boundary frames can be used to smooth the transition back to the remainder of the prerecorded livestream.

The infographic 600 includes a prerecorded livestream 610. A livestream is a streaming media event that is simultaneously recorded and broadcast in real time over the Internet. It can include audio, video, or both at the same time. Livestreaming can include a wide variety of topics, including sporting events, video games, artistic performances, marketing campaigns, political speeches, advertising presentations, and so on. Once recorded, the livestream event can be replayed and expanded as viewers comment and interact with the replay of the livestream event in real time. In some embodiments, the prerecorded livestream can be produced from a synthesized short-form video that can include a synthesized version of a host.

The infographic 600 includes a livestream operator analyzing a prerecorded livestream 610 to determine one or more insertion points 660 for one or more synthesized video segments. In embodiments, the analyzing can include detecting one or more words spoken by the host, one or more actions of the host, one or more voice inflections of the host, and/or one or more subject matters discussed by the host; assessing the body position of the host; and so on. As in other forms of media editing, the determining of insertion points can be based on replicating what a viewer sitting in a theater, attending a movie, or watching television does naturally by focusing on the most important actors and actions in view. The closer the insertion point matches the exact moment when a viewer expects to see or hear an answer to a question or a response to a comment, to see a product in use, or to view a closeup the host's face, etc., the more invisible the transition from the livestream to the inserted video segment will be. Another element of determining the insertion point is making sure that the tone values and scene arrangement of the last frame of the livestream match, as nearly as possible, the tone values and scene arrangement of the first frame of the inserted video segment. For example, the transition to a synthesized video segment can include a view of a product for sale in the first few frames of the video segment, followed by a view of the host performing the remainder of the video segment in the same setting as that of the prerecorded livestream. Today's media viewers are accustomed to a still view of a product lasting two to three seconds as a host voice speaks about the product in commercial advertising, livestream events, and in-home shopping network segments. Selecting a point in a prerecorded livestream where the host begins to speak about a product for sale can provide a likely spot for inserting a synthesized video segment with more information about the product. After the still view of the product is complete, the synthesized video segment can continue with a view of the host in the same setting as before the insertion of the video segment. The viewer continues to watch the synthesized video segment without noticing the transition from the prerecorded livestream to the video segment.

The analyzing of the prerecorded livestream 610 to determine insertion points 660 can be accomplished by an artificial intelligence (AI) machine learning neural network. In some embodiments, the insertion points can be located in the prerecorded livestream using a generative model. The generative model can include a generative adversarial network (GAN). A generative adversarial network (GAN) includes two parts. A generator learns to generate plausible insertion points in a prerecorded livestream. The generated instances are input to a discriminator. The discriminator learns to distinguish the generator's fake data from real data. The real data can come from a set of video segment insertions completed by a professional editor. The data can include the actions and body position of the host in the video frames just prior to the insertion point; the text, subject matter, and vocal inflections of the host's voice just prior to the insertion point; and so on. The discriminator penalizes the generator for generating implausible results. During the training process, over time, the output of the generator improves, and the discriminator has less success distinguishing real output from fake output. The generator and discriminator can be implemented as neural networks, with the output of the generator connected to the input of the discriminator. Embodiments may utilize backpropagation to create a signal that the generator neural network uses to update its weights.

The discriminator may use training data coming from two sources, real data, which can include insertion points in the prerecorded livestream selected by one or more professional editors, and fake data, which comprises insertion points identified by the generator. The discriminator uses the fake data as negative examples during the training process. A discriminator loss function is used to update weights via backpropagation for discriminator loss when it misidentifies an insertion point. The generator learns to create fake data by incorporating feedback from the discriminator. Essentially, the generator learns how to "trick" the discriminator into classifying its output as real. A generator loss function is used to penalize the generator for failing to trick the discriminator. Thus, in embodiments, the generative adversarial network (GAN) includes two separately trained networks. The discriminator neural network can be trained first, followed by training the generative neural network, until a desired level of convergence is achieved. In embodiments, prerecorded livestream and synthesized video segment analyses may be used to generate a set of acceptable insertion points. In FIG. 6, four insertion points are identified: T0 622, T1 632, T2 642, and T3 652. The insertion points correspond to four frames in the prerecorded livestream (620, 630, 640, and 650) that are identified by the livestream operator and AI machine learning model. In embodiments, the at least one insertion point can be stored with metadata associated with the prerecorded livestream.

Figure 7:
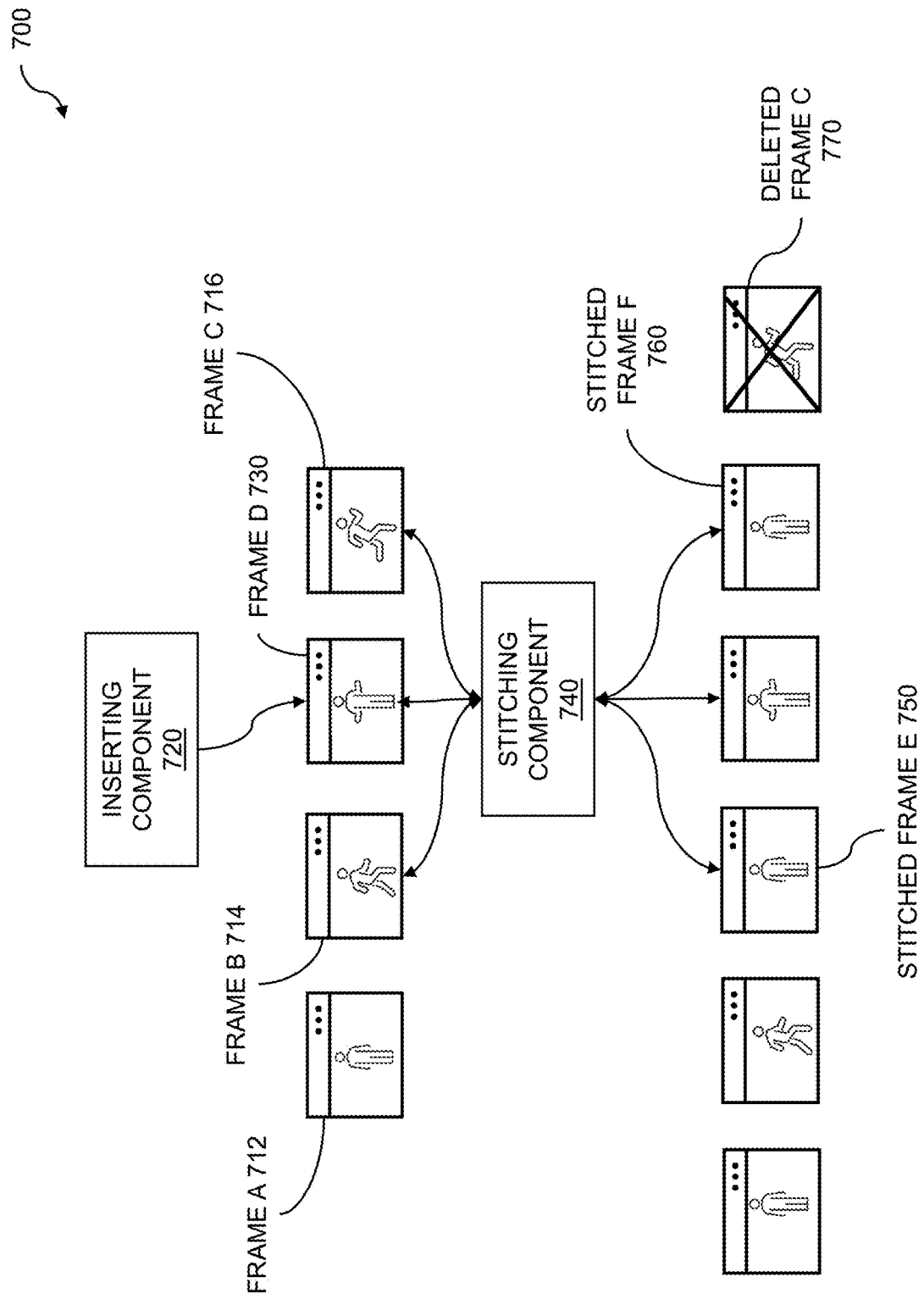
FIG. 7 is an infographic for stitching.

FIG. 7 is an infographic 700 for stitching. A prerecorded livestream can be analyzed to determine insertion points for placing synthesized video segments into the livestream event. The insertion points can be determined based on words spoken by the host, actions taken by the host, voice inflections of the host, subjects discussed by the host, body positions of the host, and so on. The livestream operator can select the insertion point based on the comments and questions raised by viewers during the livestream event, so that the synthesized video segment becomes the response to a viewer comment or question. The insertion of the synthesized video segment can be accomplished by stitching the segment into the livestream event at one of the determined insertion points. One or more boundary frames can be identified in the prerecorded livestream and the synthesized video segment and can be used to smooth the transition from the livestream to the video segment. The stitching component can insert or remove one or more frames from the beginning or end of the video segment or from the boundary frames of the livestream in order to make the transition from one to the other seamless. At the end of the synthesized video segment, boundary frames can be used to smooth the transition back to the remainder of the prerecorded livestream.

The infographic 700 includes an inserting component 720. In embodiments, the inserting component 720 analyzes a prerecorded livestream using an AI machine learning model. In FIG. 7, the inserting component 720 determines an insertion point between Frame B 714 and Frame C 716 of the prerecorded livestream in which to place a synthesized video segment Frame D 730. After the insertion of the synthesized video segment, the infographic 700 includes a stitching component 740. In some embodiments, the stitching component can use an AI machine learning model in a similar manner to the inserting component, using a generative model. The machine learning model can include the actions and body position of the host in the video frames just prior to the insertion point; the text, subject matter, and vocal inflections of the host's voice just prior to the insertion point; and so on. The stitching process may use copies of frames 712 from other points in the livestream or synthesized video. It can repeat frames within either video or delete frames as needed in order to produce the least noticeable transition from the livestream to the synthesized video. The resulting video in this example can thus be Frame A 712, Frame B 714, stitched Frame E 750, synthetic video segment Frame D 730, stitched frame F 760.

The stitching can also include deleting one or more frames of the prerecorded livestream. In FIG. 7, frame C 716 is shown as deleted frame C 770 after the stitching process is complete. Deleting one or more frames of the livestream video may be required to make the least noticeable transition from the livestream to the synthesized video or from the end of the synthesized video segment to the remainder of the prerecorded livestream. For example, the last statement of the host in the synthesized video segment may be the same as, or similar to, the first statement of the remaining prerecorded livestream to be rendered after the synthesized video segment. The livestream operator can determine that the best stitching option is to delete the first statement of the host Frame C 770 in the remaining prerecorded livestream after the insertion point, so that the statement rendered to the viewers is made by the host at the end of the synthesized video segment Frame D 730. In some embodiments, the inserted synthesized video segment becomes the response to an interaction by one or more viewers of the prerecorded livestream. The inserting process can include more than one synthesized video segment as more comments or questions from viewers occur during a livestream event.

Figure 8:
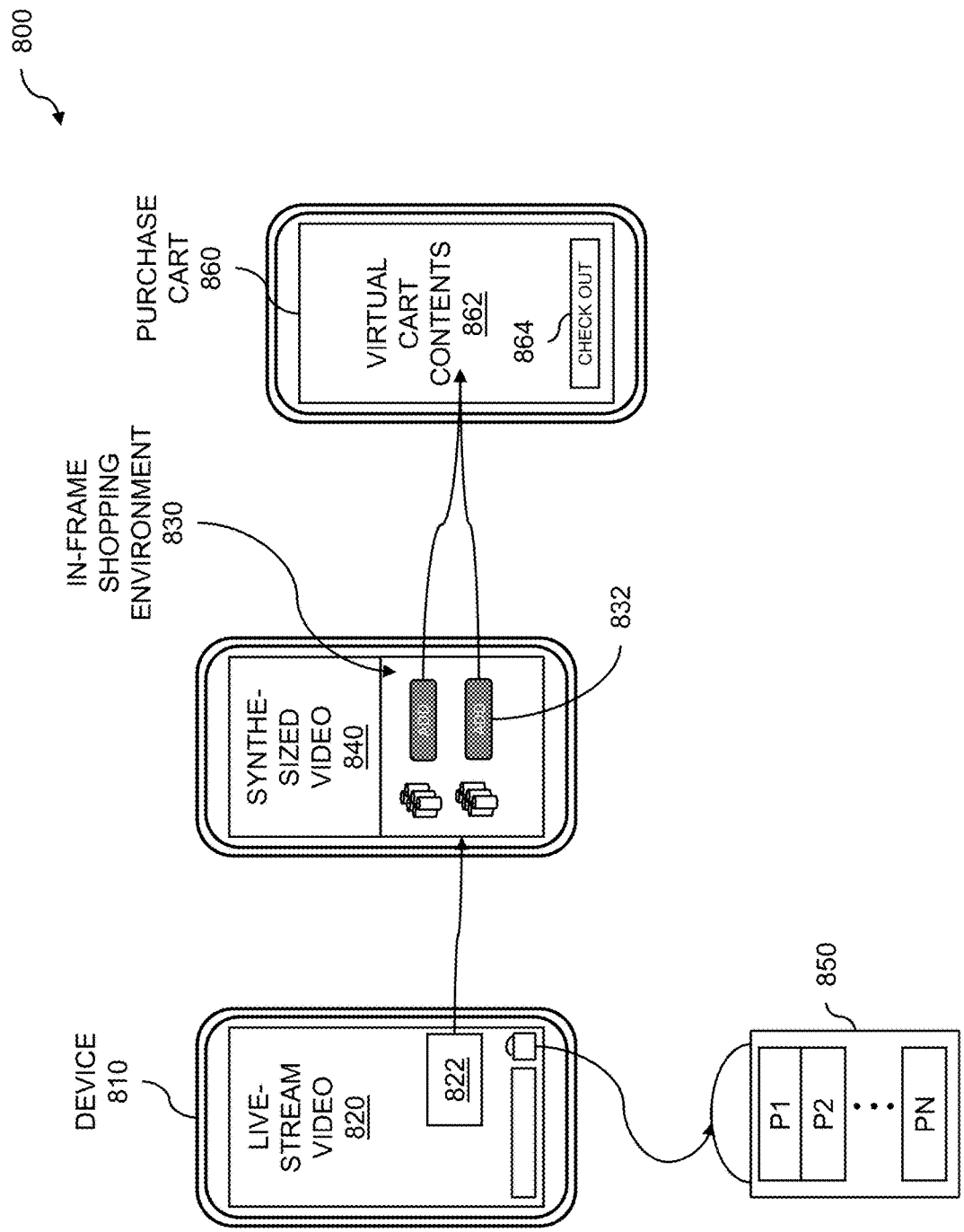
FIG. 8 shows an ecommerce purchase.

FIG. 8 shows an ecommerce purchase example. As described above and throughout, a prerecorded livestream can be rendered to one or more viewers. The livestream event can include synthesized video segments that can be inserted into the prerecorded livestream in response to comments from viewers. The livestream can highlight one or more products available for purchase during the livestream event. An ecommerce purchase can be enabled during the livestream event using an in-frame shopping environment. The in-frame shopping environment can allow CTV viewers and participants of the livestream event to buy products and services during the livestream event. The livestream event can include an on-screen product card that can be viewed on a CTV device and a mobile device. The in-frame shopping environment or window can also include a virtual purchase cart that can be used by viewers as the short-form video livestream event plays.

The example 800 includes a device 810 displaying a short-form video 820 as part of a livestream event. In embodiments, the prerecorded livestream 820 can be viewed in real time or replayed at a later time. The device 810 can be a smart TV which can be directly attached to the Internet; a television connected to the Internet via a cable box, TV stick, or game console; an Over-the-Top (OTT) device such as a mobile phone, laptop computer, tablet, pad, or desktop computer; etc. In embodiments, the accessing the prerecorded livestream 820 on the device 810 can be accomplished using a browser or another application running on the device.

The example 800 includes generating and revealing a product card 822 on the device 810. In embodiments, the product card represents at least one product available for purchase while the livestream short-form video plays. Embodiments can include inserting a representation of the first object into the on-screen product card. A product card is a graphical element such as an icon, thumbnail picture, thumbnail video, symbol, or other suitable element that is displayed in front of the video. The product card is selectable via a user interface action such as a press, swipe, gesture, mouse click, verbal utterance, or other suitable user action. The product card can be inserted when the prerecorded livestream 820 or an inserted synthesized video segment 840 are visible in the livestream event. When the product card is invoked, an in-frame shopping environment 830 is rendered over a portion of the video while the video continues to play. This rendering enables an ecommerce purchase 832 by a user while preserving a continuous video playback session. In other words, the user is not redirected to another site or portal that causes the video playback to stop. Thus, viewers are able to initiate and complete a purchase completely inside of the video playback user interface, without being directed away from the currently playing video. Allowing the livestream event to play during the purchase can enable improved audience engagement, which can lead to additional sales and revenue, one of the key benefits of disclosed embodiments. In some embodiments, the additional on-screen display that is rendered upon selection or invocation of a product card conforms to an Interactive Advertising Bureau (IAB) format. A variety of sizes are included in IAB formats, such as for a smartphone banner, mobile phone interstitial, and the like.

The example 800 includes rendering an in-frame shopping environment 830 to enable a purchase of the at least one product for sale by the viewer, wherein the ecommerce purchase is accomplished within the livestream event window 840. In embodiments, the livestream event can include the prerecorded livestream 820 or an inserted synthetic video segment 840. The enabling can include revealing a virtual purchase cart 860 that supports checkout 864 of virtual cart contents 862, including specifying various payment methods, and applying coupons and/or promotional codes. In some embodiments, the payment methods can include fiat currencies such as United States dollar (USD), as well as virtual currencies, including cryptocurrencies such as Bitcoin. In some embodiments, more than one object (product) can be highlighted and enabled for ecommerce purchase. In embodiments, when multiple items 850 are purchased via product cards during the livestream event, the purchases 850 are cached until termination of the video, at which point the orders are processed as a batch. The termination of the video can include the user stopping playback, the user exiting the video window, the livestream ending, or a prerecorded video ending. The batch order process can enable a more efficient use of computer resources, such as network bandwidth, by processing the orders together as a batch instead of processing each order individually.

Figure 9:
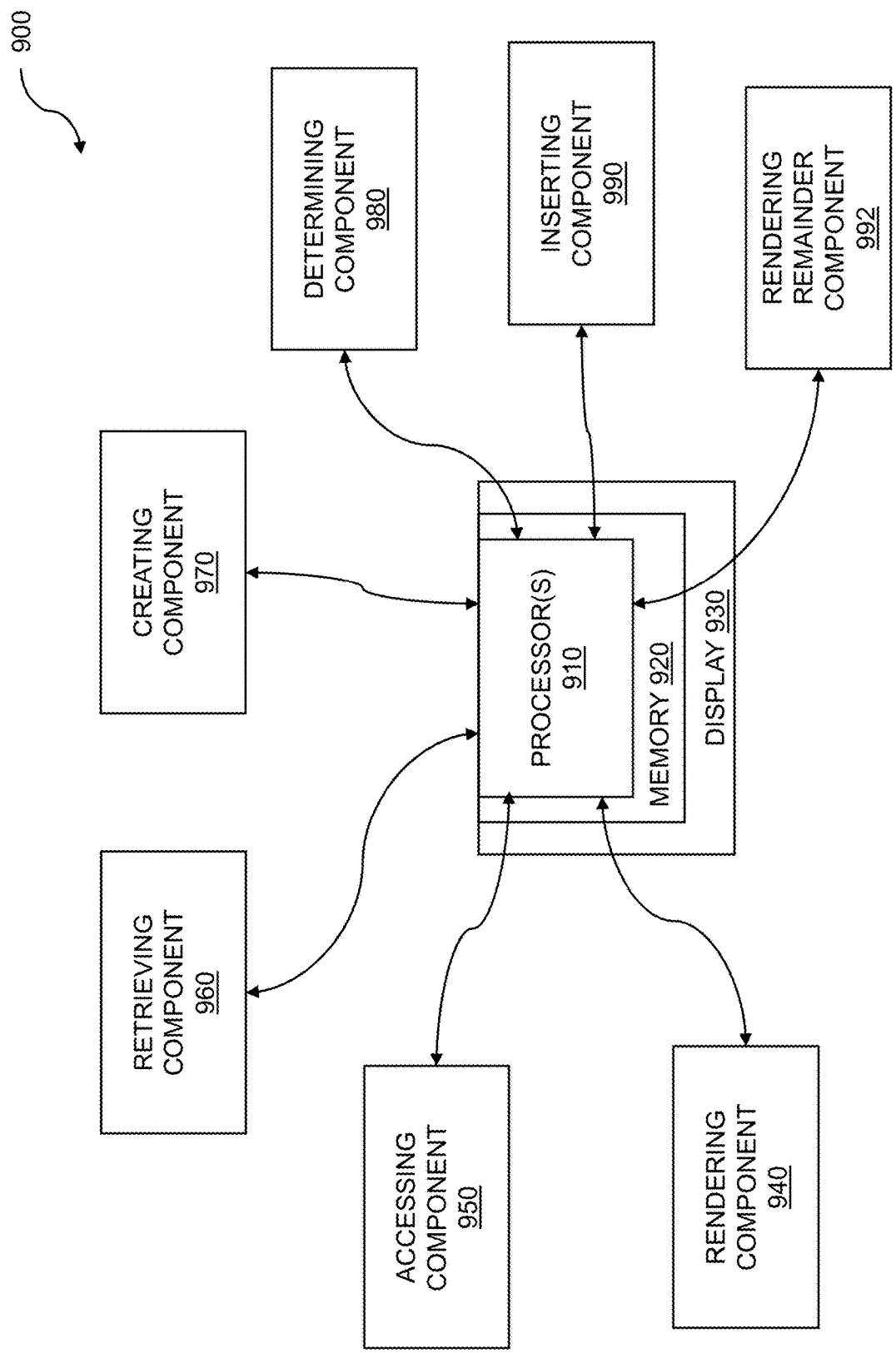
FIG. 9 is a system diagram for a livestream with synthetic scene insertion.

FIG. 9 is a system diagram for a livestream with synthetic scene insertion. The system 900 can include one or more processors 910 coupled to a memory 920 which stores instructions. The system 900 can include a display 930 coupled to the one or more processors 910 for displaying data, video streams, videos, intermediate steps, instructions, and so on. In embodiments, one or more processors 910 are coupled to the memory 920 where the one or more processors, when executing the instructions which are stored, are configured to: render a prerecorded livestream, wherein the prerecorded livestream features a host and is viewed by one or more viewers; access, by an operator, a video segment that is related to the prerecorded livestream, wherein the video segment includes a performance by an individual; retrieve an image of the host; create, from the video segment that was accessed, a synthesized video segment, wherein the synthesized video segment includes the performance accomplished by the host; determine at least one insertion point, within the prerecorded livestream, for the synthesized video segment; insert, by the operator, the synthesized video segment into the prerecorded livestream at the at least one insertion point, wherein the inserting is accomplished dynamically and wherein the inserting appears seamless to the viewer; and render a remainder of the prerecorded livestream after the at least one insertion point.

The system 900 can include a rendering component 940. The rendering component 940 can include functions and instructions for providing video analysis for rendering a prerecorded livestream, wherein the prerecorded livestream features a host and is viewed by one or more viewers. In embodiments, the prerecorded livestream can comprise a synthesized short-form video. The livestream host can comprise a synthesized version of the host. The rendering component 940 can render one or more synthesized video segments, wherein the synthesized video segments include the performance accomplished by the host. The rendering component 940 can render an ecommerce purchase environment, including an on-screen product card and a virtual product cart. The virtual product cart can be displayed while the prerecorded livestream or a synthesized video play. In some embodiments, the virtual product cart can cover a portion of the prerecorded livestream or synthesized video segment while they are rendered.

The system 900 can include an accessing component 950. The accessing component 950 can include functions and instructions for accessing, by an operator, a video segment that is related to the prerecorded livestream wherein the video segment includes a performance by an individual. In embodiments, the operator can include an artificial intelligence (AI) machine learning model. In some embodiments, the accessing component can access a second video segment that is related to the prerecorded livestream, wherein the second video segment includes a second performance by the individual. The second video segment can include a performance by a second individual. The performance of the first or second individual in the video segment can include highlighting a product for sale for the viewer.

The system 900 can include a retrieving component 960. The retrieving component 960 can include functions and instructions for retrieving at least one image of the livestream host from the prerecorded livestream. In some embodiments, the retrieving component can retrieve images of the livestream host from still photographs or additional short-form videos. The retrieving component can be used to retrieve video segments that relate to a prerecorded livestream. The video segments can be used to form responses to comments or questions from viewers of the prerecorded livestream as it is rendered.

The system 900 can include a creating component 970. The creating component 970 can include functions and instructions for creating, from the video segment that was accessed, a synthesized video segment, wherein the synthesized video segment includes the performance of the host. In embodiments, the creating is accomplished with machine learning. In some embodiments, the creating component 970 can include generating, from a second video segment, a second synthesized video segment, wherein the second synthesized video segment includes the second performance accomplished by the livestream host. In embodiments, the synthesized video segment can include deep fake material, synthesized audio, and a synthesized voice for the livestream host. The synthesized voice can be based on a voiceprint from the host and can include AI-generated speech.

The system 900 can include a determining component 980. The determining component 980 can include functions and instructions for determining at least one insertion point within the prerecorded livestream for the synthesized video segment. In embodiments, the determining at least one insertion point further comprises forming a response to an interaction by the one or more viewers of the prerecorded livestream. The determining at least one insertion point further comprises analyzing the prerecorded livestream. The analyzing is accomplished by machine learning and can include detecting one or more words spoken by the host, one or more actions of the host, one or more voice inflections of the host, and/or one or more subject matters discussed by the host; and assessing a body position of the host.

The system 900 can include an inserting component 990. The inserting component 990 can include functions and instructions for inserting, by the operator, the synthesized video segment into the prerecorded livestream at the at least one insertion point, wherein the inserting is accomplished dynamically and wherein the inserting appears seamless to the viewer. In some embodiments, the inserting the synthesized video segment comprises the response to the interaction by the one or more viewers. In embodiments, the inserting the synthesized video segment further comprises stitching the synthesized video segment into the prerecorded livestream at the one or more insertion points. The stitching occurs at one or more boundary frames at the one or more insertion points between the synthesized video and the prerecorded livestream. In some embodiments, the stitching comprises differentiating an object from a background in the prerecorded livestream or the synthesized video segment. The stitching can include removing the object from the synthesized video segment or the prerecorded livestream. The stitching can include restoring a corrupt video frame. The restoring can include evaluating one or more video frames before and after the corrupt video frame. In some embodiments, the stitching can comprise deleting a frame of the prerecorded livestream. The inserting component 990 can include inserting a synthesized video segment that includes images or videos relevant to a subject or subject matter discussed by the livestream host. In some embodiments, the inserting can include a second synthesized video segment.

The system 900 can include a rendering remainder component 992. The rendering remainder component 992 can include functions and instructions for rendering a remainder of the prerecorded livestream after the one or more insertion points. The rendering remaining component 992 can render an ecommerce purchase environment, including an on-screen product card and a virtual product cart. The virtual product cart can be displayed while the prerecorded livestream or a synthesized video play. In some embodiments, the virtual product cart can cover a portion of the prerecorded livestream or synthesized video segment while they are rendered.

The system 900 can include a computer program product embodied in a non-transitory computer readable medium for video analysis, the computer program product comprising code which causes one or more processors to perform operations of: rendering a prerecorded livestream, wherein the prerecorded livestream features a host and is viewed by one or more viewers; accessing, by an operator, a video segment that is related to the prerecorded livestream, wherein the video segment includes a performance by an individual; retrieving an image of the host; creating, from the video segment that was accessed, a synthesized video segment, wherein the synthesized video segment includes the performance accomplished by the host; determining at least one insertion point, within the prerecorded livestream, for the synthesized video segment; inserting, by the operator, the synthesized video segment into the prerecorded livestream at the at least one insertion point, wherein the inserting is accomplished dynamically and wherein the inserting appears seamless to the viewer; and rendering a remainder of the prerecorded livestream after the at least one insertion point.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams, infographics, and flowchart illustrations depict methods, apparatus, systems, and computer program products. The elements and combinations of elements in the block diagrams, infographics, and flow diagrams show functions, steps, or groups of steps of the methods, apparatus, systems, computer program products and/or computer-implemented methods. Any and all such functions—generally referred to herein as a "circuit," "module," or "system"—may be implemented by computer program instructions, by special-purpose hardware-based computer systems, by combinations of special purpose hardware and computer instructions, by combinations of general-purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited to neither conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM); an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States, then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A computer-implemented method for video analysis comprising:
    rendering a prerecorded livestream, wherein the prerecorded livestream features a host and is viewed by one or more viewers;
    accessing, by an operator, a video segment that is related to the prerecorded livestream, wherein the video segment includes a performance by an individual;
    retrieving an image of the host;

creating, from the video segment that was accessed, a synthesized video segment, wherein the synthesized video segment includes the performance accomplished by the host;

determining at least one insertion point, within the prerecorded livestream, for the synthesized video segment;

inserting, by the operator, the synthesized video segment into the prerecorded livestream at the at least one insertion point, wherein the inserting is accomplished dynamically and wherein the inserting appears seamless to a viewer; and rendering a remainder of the prerecorded livestream after the at least one insertion point.

2. The method of claim 1 wherein the determining at least one insertion point further comprises forming a response to an interaction by the one or more viewers of the prerecorded livestream.

3. The method of claim 1 wherein the determining at least one insertion point further comprises analyzing the prerecorded livestream.

4. The method of claim 1 wherein the at least one insertion point is stored with metadata associated with the prerecorded livestream.

5. The method of claim 1 wherein the accessing includes accessing a second video segment that is related to the prerecorded livestream, wherein the second video segment includes a second performance by the individual.

6. The method of claim 1 wherein the determining at least one insertion point further comprises assessing a body position.

7. The method of claim 1 wherein the inserting the synthesized video segment further comprises stitching the synthesized video segment into the prerecorded livestream at the at least one insertion point.

8. The method of claim 1 wherein the synthesized video segment includes synthesized audio.

9. The method of claim 1 further comprising enabling an ecommerce purchase, within the prerecorded livestream, of a product for sale.

10. The method of claim 2 wherein the inserting the synthesized video segment comprises the response to the interaction by the one or more viewers.

11. The method of claim 3 wherein the analyzing includes detecting one or more words spoken by the host.

12. The method of claim 3 wherein the analyzing includes detecting one or more actions of the host.

13. The method of claim 3 wherein the analyzing includes detecting one or more voice inflections of the host.

14. The method of claim 3 wherein the analyzing includes detecting one or more subject matters discussed by the host.

15. The method of claim 5 wherein the second video segment includes a performance by a second individual.

16. The method of claim 5 wherein the creating further comprises generating, from the second video segment, a second synthesized video segment, wherein the second synthesized video segment includes the second performance accomplished by the host.

17. The method of claim 16 wherein the inserting includes the second synthesized video segment.

18. The method of claim 7 wherein the stitching occurs at one or more boundary frames at the at least one insertion point between the synthesized video segment and the prerecorded livestream.

19. The method of claim 18 wherein the stitching further comprises differentiating an object from a background.

20. The method of claim 18 wherein the stitching further comprises restoring a corrupt video frame.

21. The method of claim 18 wherein the stitching further comprises deleting a frame of the prerecorded livestream.

22. The method of claim 18 wherein the stitching further comprises assessing a body position.

23. The method of claim 19 further comprising removing the object from the synthesized video segment or the prerecorded livestream.

24. The method of claim 20 wherein the restoring includes evaluating one or more video frames before and after the corrupt video frame.

25. A computer program product embodied in a non-transitory computer readable medium for video analysis, the computer program product comprising code which causes one or more processors to perform operations of:

rendering a prerecorded livestream, wherein the prerecorded livestream features a host and is viewed by one or more viewers;

accessing, by an operator, a video segment that is related to the prerecorded livestream, wherein the video segment includes a performance by an individual;

retrieving an image of the host;

creating, from the video segment that was accessed, a synthesized video segment, wherein the synthesized video segment includes the performance accomplished by the host;

determining at least one insertion point, within the prerecorded livestream, for the synthesized video segment;

inserting, by the operator, the synthesized video segment into the prerecorded livestream at the at least one insertion point, wherein the inserting is accomplished dynamically and wherein the inserting appears seamless to a viewer; and rendering a remainder of the prerecorded livestream after the at least one insertion point.

26. A computer system for video analysis comprising:

a memory which stores instructions;

one or more processors coupled to the memory wherein the one or more processors, when executing the instructions which are stored, are configured to:

render a prerecorded livestream, wherein the prerecorded livestream features a host and is viewed by one or more viewers;

access, by an operator, a video segment that is related to the prerecorded livestream, wherein the video segment includes a performance by an individual;

retrieve an image of the host;

create, from the video segment that was accessed, a synthesized video segment, wherein the synthesized video segment includes the performance accomplished by the host;

determine at least one insertion point, within the prerecorded livestream, for the synthesized video segment;

insert, by the operator, the synthesized video segment into the prerecorded livestream at the at least one insertion point, wherein inserting is accomplished dynamically and wherein the inserting appears seamless to a viewer; and render a remainder of the prerecorded livestream after the at least one insertion point.

* * * * *